United States Patent
Miyamoto et al.

(10) Patent No.: US 8,970,073 B2
(45) Date of Patent: Mar. 3, 2015

(54) COOLING STRUCTURE FOR ROTARY ELECTRIC MACHINE

(75) Inventors: Tomohiko Miyamoto, Toyota (JP); Tetsuo Wakita, Chiryu (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 411 days.

(21) Appl. No.: 13/275,454

(22) Filed: Oct. 18, 2011

(65) Prior Publication Data
US 2012/0091838 A1   Apr. 19, 2012

(30) Foreign Application Priority Data

Oct. 19, 2010 (JP) .................. 2010-234262
Oct. 19, 2010 (JP) .................. 2010-234345
Oct. 19, 2010 (JP) .................. 2010-234388

(51) Int. Cl.
*H02K 9/19* (2006.01)
*H02K 1/20* (2006.01)
*H02K 5/20* (2006.01)
*H02K 9/00* (2006.01)

(52) U.S. Cl.
CPC .. *H02K 9/19* (2013.01); *H02K 5/20* (2013.01); *H02K 1/20* (2013.01); *H02K 9/005* (2013.01)
USPC ............................ 310/54; 310/58

(58) Field of Classification Search
CPC .............. H02K 1/20; H02K 9/19; H02K 5/20
USPC ...................................... 310/54, 58
See application file for complete search history.

(56) References Cited

U.S. PATENT DOCUMENTS

| | | | | |
|---|---|---|---|---|
| 2,338,154 A | * | 1/1944 | Wilkinson | 310/54 |
| 6,218,747 B1 | | 4/2001 | Tsuruhara | |
| 6,515,384 B1 | * | 2/2003 | Kikuchi et al. | 310/58 |
| 6,933,633 B2 | * | 8/2005 | Kaneko et al. | 310/52 |

(Continued)

FOREIGN PATENT DOCUMENTS

| | | | | |
|---|---|---|---|---|
| JP | 05091696 A | * | 4/1993 | H02K 9/19 |
| JP | 2000262013 A | | 9/2000 | |

(Continued)

OTHER PUBLICATIONS

Translation of foreign document JP 2003324901.*

(Continued)

*Primary Examiner* — Alex W Mok
(74) *Attorney, Agent, or Firm* — Gifford, Krass, Sprinkle, Anderson & Citkowski, P.C.

(57) ABSTRACT

A cooling structure for a rotary electric machine uses coolant to cool coil end portions that protrude outward, one from each end surface of a stator core, in a stator that includes a stator core and coils that are wound in a circumferential direction of the stator core. This cooling structure includes a lead side cover member that covers a lead side coil end portion to which a lead wire that supplies electricity to the coils is connected, and forms a first coolant chamber within which coolant is stored; and a non-lead side cover member that covers a non-lead side coil end portion positioned opposite the lead side coil end portion in the axial direction, and forms a second coolant chamber within which coolant is stored. A coolant communicating path is provided that communicates the first and second coolant chambers in a manner that enables coolant to flow therebetween.

5 Claims, 12 Drawing Sheets

(56) References Cited

U.S. PATENT DOCUMENTS

| | | | |
|---|---|---|---|
| 7,566,999 B2* | 7/2009 | Neal | 310/54 |
| 2002/0074868 A1* | 6/2002 | Ishida | 310/54 |
| 2005/0151429 A1* | 7/2005 | Taketsuna et al. | 310/54 |
| 2008/0012436 A1* | 1/2008 | Neal | 310/54 |
| 2008/0017354 A1* | 1/2008 | Neal | 165/104.14 |
| 2008/0018181 A1* | 1/2008 | Neal | 310/54 |
| 2009/0127954 A1* | 5/2009 | Mogi | 310/90 |
| 2010/0033040 A1* | 2/2010 | Wakita | 310/54 |
| 2010/0045125 A1* | 2/2010 | Takenaka et al. | 310/54 |
| 2010/0194214 A1* | 8/2010 | Takahashi et al. | 310/43 |
| 2010/0264760 A1* | 10/2010 | Matsui et al. | 310/54 |
| 2011/0084561 A1* | 4/2011 | Swales et al. | 310/54 |
| 2011/0156510 A1* | 6/2011 | Okada et al. | 310/54 |
| 2011/0215660 A1* | 9/2011 | Goto et al. | 310/53 |
| 2011/0221286 A1* | 9/2011 | Uchiyama et al. | 310/54 |
| 2011/0234029 A1* | 9/2011 | Pal | 310/54 |

FOREIGN PATENT DOCUMENTS

| | | | | | |
|---|---|---|---|---|---|
| JP | 2003324901 A | * | 11/2003 | | H02K 9/19 |
| JP | 2004180376 A | * | 6/2004 | | H02K 9/19 |
| JP | 2004215353 A | * | 7/2004 | | H02K 9/22 |
| JP | 2005323416 A | * | 11/2005 | | H02K 9/19 |
| JP | 2005354822 A | * | 12/2005 | | H02K 9/19 |
| JP | 2006033916 A | | 2/2006 | | |
| JP | 2006115650 A | | 4/2006 | | |
| JP | 2006-271150 A | | 10/2006 | | |
| JP | 2009022145 A | | 1/2009 | | |
| JP | 2010119265 A | | 5/2010 | | |
| JP | 2010124657 A | | 6/2010 | | |
| JP | 2010124658 A | * | 6/2010 | | |
| JP | 2010226870 A | | 10/2010 | | |
| WO | 2010058278 A2 | | 5/2010 | | |

OTHER PUBLICATIONS

Translation of foreign document JP 2010119265.*

* cited by examiner

COOLING STRUCTURE FOR ROTARY ELECTRIC MACHINE

INCORPORATION BY REFERENCE

This patent application claims the priority to Japanese Patent Application No. 2010-234262 filed on Oct. 19, 2010, Japanese Patent Application Publication No. 2010-234345 filed on Oct. 19, 2010 and Japanese Patent Application No. 2010-234388 filed on Oct. 19, 2010, which are incorporated herein by reference in their entirety, including the specification, drawings and abstract.

BACKGROUND OF THE INVENTION

1. Field of the Invention

The invention relates to a cooling structure for a rotary electric machine, and more particularly, to a cooling structure for a rotary electric machine, that uses coolant to cool coil end portions of a stator coil.

2. Description of Related Art

A rotary electric machine that includes a stator provided with a plurality of stator coils (hereinafter simply referred to as "coils" where appropriate) arranged in the circumferential direction on an inner peripheral portion of a cylindrical stator core is known. These coils are wound around teeth that are formed protruding radially inward on the inner peripheral portion of the stator core, and include coil end portions in which both end portions of the coils protrude to the outside at both ends of the stator in the axial direction.

Each coil is connected to a lead wire, and current flows to the coil by applying voltage from an external source via this lead wire. At this time, so-called copper loss due to electrical resistance occurs at the inner portion of conductive wire such as copper wire that is covered with insulation, for example, and used to form the coils. As a result, the coils generate heat. This heat causes the coil temperature to rise, and when the coil temperature rises, the insulating performance of the coils decreases. When the rotary electric machine is a polyphase alternating current (AC) motor, discharge tends to occur particularly between coil end portions of different phase coils where the potential difference is large.

In order to prevent this kind of discharge, the coil end portions of the coils are cooled by coolant such as cooling oil, for example. Japanese Patent Application Publication No. 2006-271150 (JP-A-2006-271150) describes one such related art.

JP-A-2006-271150 describes a cooling structure for a motor-generator. In this cooling structure, the coil end portions that protrude in a generally annular shape toward the outside at the axial end surfaces of the stator core are covered in a fluid-tight manner by a cooling jacket. Cooling oil is supplied so as to flow inside the jacket, such that the coil is cooled by the entire coil end portions contacting the cooling oil in the circumferential direction. Also, with this cooling structure, the stator is housed inside a cylindrical case, and a side plate is attached to each side of this case in the axial direction. An oil supply port is formed in the side plate and the cooling jacket, and an oil supply port is formed in each side in the axial direction, corresponding to the coil end portions at both ends in the axial direction.

With the cooling structure in JP-A-2006-271150, an oil supply port is provided in the cooling jacket provided on each side of the stator in the axial direction, such that cooling oil is supplied from these oil supply ports to the coil end portions on both sides in the axial direction.

However, one coil end portion to which a lead wire for supplying power to the stator coil is electrically connected, i.e., the lead side coil end portion, differs in size (i.e., the length in the axial direction and/or the width in the radial direction) and shape from the other coil end portion positioned on the opposite side in the axial direction, i.e., the non-lead side coil end portion. In particular, when the stator coil is a so-called segment coil in which a generally spiral-shaped coil is formed by a plurality of two leg portions of conductive wires bent in a general U-shape being arranged in the radial direction and inserted into slots straddling the teeth of the stator core from one side in the axial direction, and the two leg portions that are protruding outward from the other end side in the axial direction being sequentially connected to the leg portions of the adjacent conductive wires, the lead side coil end portion tends to be formed larger than the non-lead side coil end portion.

In this case, when an oil chamber is formed for each coil end portion on both sides in the axial direction using the cooling jacket of a similar shape and cooling oil is supplied into each oil chamber from the oil supply ports provided on both sides in the axial direction, the pressures and amounts of cooling oil supplied to the oil chambers may become uneven due to a difference in the size of the coil end portions or the like. As a result, even cooling performance, and thus insulating performance, in the coil end portions may not be able to be obtained.

Also, with the cooling structure in JP-A-2006-271150, two oil supply ports are formed opening toward opposite sides in the axial direction. Therefore, when attempting to connect oil supply pipes to the oil supply ports formed pointing in opposite directions as described above when assembling a motor-generator as a power supply for running that incorporates this cooling structure to a transmission, the assembly posture, the assembly space, and the work space and the like of the motor-generator may make it difficult to connect the pipe.

Also, with the cooling structure in JP-A-2006-271150, an oil supply pipe must be connected to each end of the motor-generator in the axial direction. In this case, it is difficult to connect the oil supply pipes while checking the seal of each oil supply port. In particular, if a motor-generator is mounted to an electric vehicle and the motor mounting space is set far back and is narrow and there is no work space for an assembly worker on either side in the axial direction of the motor, assemblability of the motor provided with this cooling structure into the vehicle is poor.

SUMMARY OF THE INVENTION

The invention provides a cooling structure for a rotary electric machine, that is capable of making coil cooling performance the same on both sides in the axial direction by evening out the amount of coolant inside two coolant chambers that are formed one on each side in the axial direction annularly covering a coil end portion.

The invention also provides a cooling structure for a rotary electric machine, that is capable of facilitating the work of connecting a coolant supply conduit to two coolant supply ports for supplying coolant into two coolant chambers that are formed one on each side in the axial direction annularly covering a coil end portion.

The invention further provides a cooling structure for a rotary electric machine, that is capable of facilitating the work of connecting a conduit for supplying coolant to coil end portions on both sides in the axial direction, and improving assemblability of the rotary electric machine and mountability thereof to an electric vehicle.

A first aspect of the invention relates to a cooling structure for a rotary electric machine. This cooling structure uses coolant to cool coil end portions that protrude outward, one from each end surface of a stator core in an axial direction of a stator, in a stator that includes a cylindrical stator core and a plurality of coils that are wound in a circumferential direction of the stator core. This cooling structure includes a lead side cover member that covers a lead side coil end portion to which a lead wire that supplies electricity to the coils is connected, and forms a first coolant chamber within which coolant is stored; and a non-lead side cover member that covers a non-lead side coil end portion positioned opposite the lead side coil end portion in the axial direction, and forms a second coolant chamber within which coolant is stored. Also, a coolant communicating path is provided that communicates the first coolant chamber with the second coolant chamber in a manner that enables coolant to flow therebetween.

With the cooling structure for a rotary electric machine according to this aspect, the first coolant chamber formed by the lead side cover member is communicated via the coolant communicating path with the second coolant chamber formed by the non-lead side cover member. Therefore, even if the amounts and pressures of the coolant supplied to the coolant chambers are different, the amounts of coolant in the coolant chambers are able to be balanced by moving coolant between the two chambers via the communicating path. As a result, the coil cooling performance is able to be made the same on both sides in the axial direction.

A second aspect of the invention relates to a cooling structure for a rotary electric machine. This cooling structure uses coolant to cool coil end portions that protrude outward, one from each end surface of a stator core in an axial direction of a stator, in a stator that includes a cylindrical stator core and a plurality of coils that are wound in a circumferential direction of the stator core. This cooling structure includes a lead side cover member that covers a lead side coil end portion to which a lead wire that supplies electricity to the coils is connected, and forms a first coolant chamber within which coolant is stored; a non-lead side cover member that covers a non-lead side coil end portion positioned opposite the lead side coil end portion in the axial direction, and forms a second coolant chamber within which coolant is stored; and a coolant supply conduit that is connected to a first coolant supply port that supplies coolant to the first coolant chamber, and a second coolant supply port that supplies coolant to the second coolant chamber. The first coolant supply port and the second coolant supply port are formed separately so as to be opened in the same direction in at least one of the cover members.

With the cooling structure for a rotary electric machine according to this aspect, the first coolant supply port for supplying coolant to the lead side first coolant chamber and the second coolant supply port for supplying coolant to the non-lead side second coolant chamber are formed separately in the same direction in at least one of the cover chambers. Therefore, the work of connecting the coolant supply conduit to the first coolant supply port and the second coolant supply port can be easily performed from one direction while checking the seal of the connecting portion.

A third aspect of the invention relates to a cooling structure for a rotary electric machine. This cooling structure uses coolant to cool coil end portions that protrude outward, one from each end surface of a stator core in an axial direction of a stator, in a stator that includes a cylindrical stator core and a plurality of coils that are wound in a circumferential direction of the stator core. This cooling structure includes a lead side cover member that covers a lead side coil end portion to which a lead wire that supplies electricity to the coils is connected, and forms a first coolant chamber within which coolant is stored, and has a first coolant supply path that is communicated with the first coolant chamber; and a non-lead side cover member that covers a non-lead side coil end portion positioned opposite the lead side coil end portion in the axial direction, and forms a second coolant chamber within which coolant is stored, and has a second coolant supply path that is communicated with the second coolant chamber. A coolant supply port that supplies coolant into the first coolant chamber via the first coolant supply path and into the second coolant chamber via the second coolant supply path is formed on a side of one of the lead side cover member and the non-lead side cover member. Here, the phrase "on a side of one of the lead side cover member and the non-lead side cover member" includes both a case in which a coolant supply port is formed on one of the cover members itself, and a case in which a coolant supply port is provided on a side in the axial direction where one of the cover members is positioned.

With the cooling structure for a rotary electric machine according to this aspect, the coolant supply port for supplying coolant to the first coolant chamber via the first coolant supply path and to the second coolant chamber via the second coolant supply path is formed on a side of one of the lead side cover member and the non-lead side cover member. Therefore, the work of connecting the coolant supply conduit in a fluid-tight manner to the coolant supply port of the rotary electric machine that includes this cooling structure can be easily performed from one direction, which both improves assemblability of the rotary electric machine and mountability when mounting this kind of rotary electric machine to a vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings. In the description, the specific shapes, materials, numeric values, and directions and the like are merely examples to facilitate understanding of the invention, and may be changed as appropriate according to the use, objective, and specifications and the like.

In the description below, coolant used with the cooling structure for a rotary electric machine according to this example embodiment is described as being cooling oil, but the coolant of the cooling structure of this invention is not limited to this. For example, other coolant such as LLC may be used.

Figure 1:
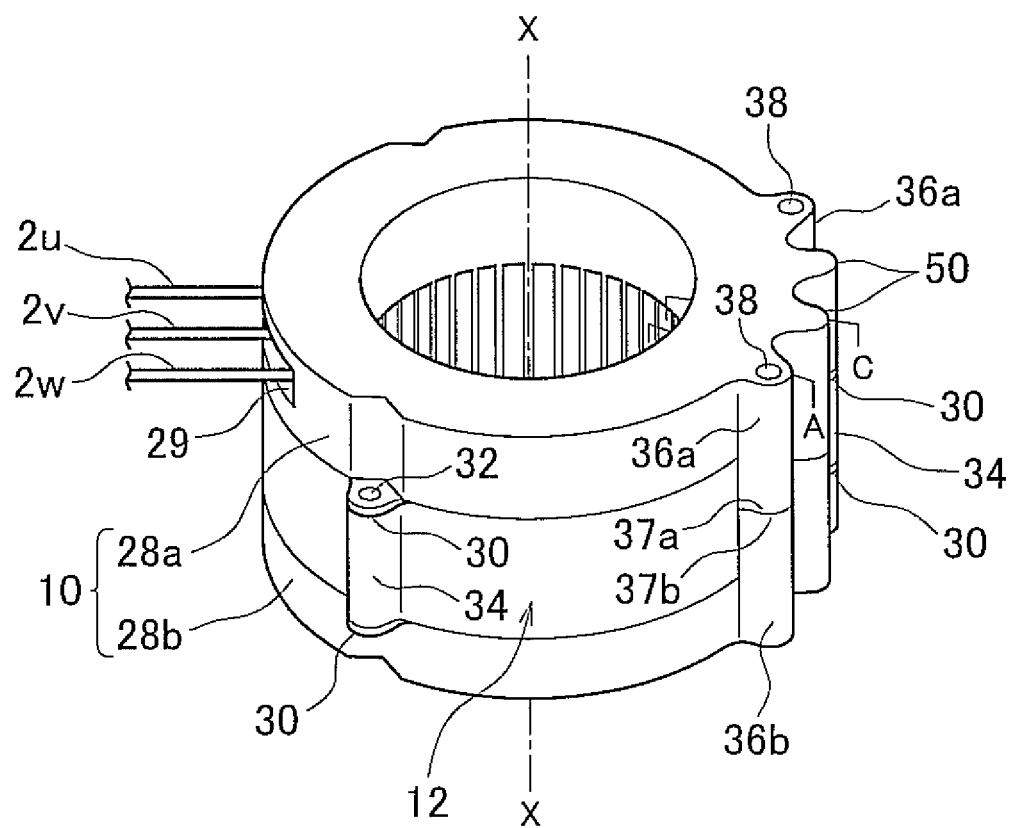
FIG. 1 is a perspective view of a stator provided with a cooling structure according to a first example embodiment of the invention.
Figure 2:
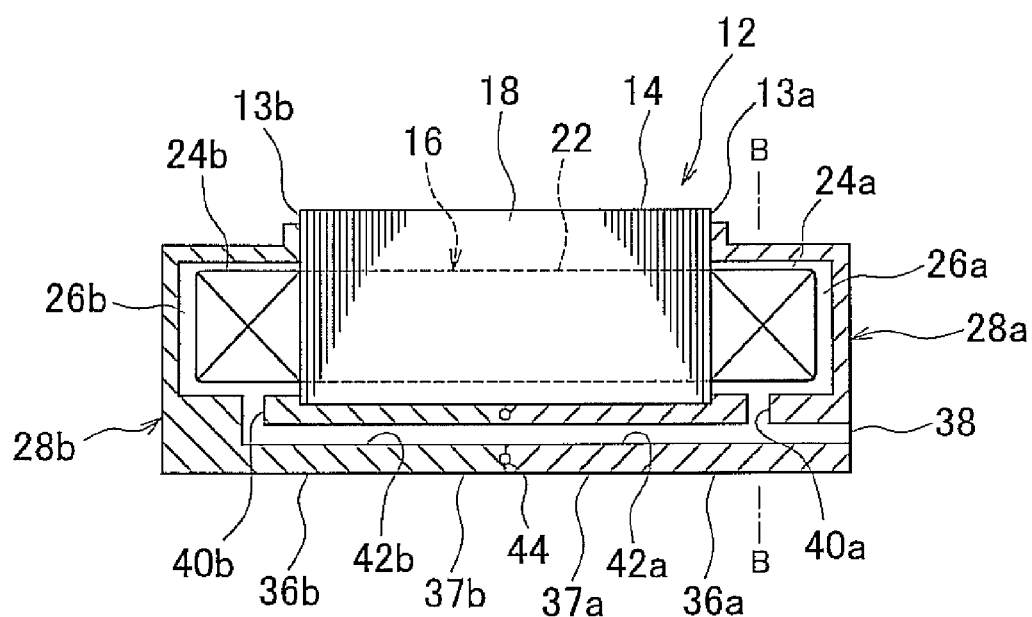
FIG. 2 is a sectional view taken along line A-A in FIG. 1.

A first example embodiment of the invention will now be described. FIG. 1 is a perspective view of a cooling structure 10 for a rotary electric machine according to this example embodiment that is mounted to a stator 12 for the rotary electric machine. FIG. 2 is a sectional view taken along line A-A in FIG. 1. Here, an axis X in FIG. 1 is the center axis of the stator and stator core that are formed in cylindrical shapes. The direction along this center axis X will be referred to as the axial direction, the direction orthogonal to this center axis X will be referred to as the radial direction, and the direction along the circumference of a circle that is drawn on a plane orthogonal to the center axis X and is centered on a point on the center axis X will be referred to as the circumferential direction. Also, in FIG. 2, only a cross-section in the axial direction on one side in the radial direction, in the circumferential direction of the cylindrical stator 12, i.e., only a cross-section in the axial direction of the vertically lower half when and the rotary electric machine is mounted in a vehicle with the center axis X lying in the horizontal direction, is shown.

The stator 12 includes a cylindrical stator core 14, and a coil 16 provided on an inner peripheral portion of the stator core 14. The stator core 14 is formed by stacking together a plurality of magnetic steel sheets such as silicon steel sheets, for example, that have been stamped out in a ring shape, and integrally connecting these sheets together by a method such as crimping, welding, adhesion, or fitting. An IPM type rotor, not shown, is rotatably provided inside the stator 12, and this rotor is rotatably driven by a rotating magnetic field that is electrically created inside the stator 12.

A plurality of teeth 18 (see FIGS. 8 and 9) are formed on the inner peripheral portion of the stator core 14. These teeth 18 are arranged at predetermined intervals in the radial direction, and are formed protruding radially inward and extending in the axial direction with the same axial length as the stator core 14. Also, slots 20 of the same number as there are teeth 18 are formed between adjacent teeth 18 in the radial direction. A portion of the coil 16 is housed inside the slots 20 that are empty portions, as will be described later.

The coil 16 is formed with conductive wire such as enamel copper wire, for example, wound around the teeth 18. The winding of the coil 16 may be a concentrated winding or a distributed winding. Also, the conductive wire that forms the coil 16 may have a circular cross-section or a square cross-section. Further, the coil 16 may be attached by fitting a portion formed in advance on the coil 16 together with the teeth 18 from the radial inside by winding using a jig or the like, or the coil 16 may be formed while winding the conductive wire around the teeth 18 using a coil winding machine. Alternatively, the coil 16 may be formed by arranging a plurality of segment coils, each formed in a U-shape by bending a relatively rigid square wire that has a square cross-section, for example, in the radial direction inside the slots 20 from one end side in the axial direction, and inserting these segment coils straddling the teeth 18, and then connecting one of two leg portions of a segment coil that protrudes out from an opening on the other side in the axial direction of the slots 20 with the other one of two leg portions of another segment coil that is adjacent in the radial direction. That is, the coil 16 may be a so-called segment coil in which one of two leg portions of a segment coil that protrude out from the opening on the other side in the axial direction of the slots 20 is electrically connected to the other of two leg portions of another segment coil that is inserted adjacent in the radial direction.

The coil 16 is formed of slot portions 22 positioned inside the slots 20 of the stator core 14, and coil end portions 24a and 24b formed protruding outward in the axial direction from both end surfaces 13a and 13b in the axial direction of the stator core 14. The coil end portions 24a and 24b have a generally annular shape at the end surfaces 13a and 13b of the stator core 14 when the stator 12 is viewed from the axial direction.

As shown in FIG. 1, lead wires 2u, 2v, and 2w are electrically connected to one coil end portion 24 of the coil 16 of the stator 12. These lead wires 2u, 2v, and 2w are used to apply voltage to the coil 16 from an external source. If the stator 12 is used in a three-phase alternating current rotary electric machine, for example, the plurality of coils 16 are divided into U-phase, V-phase, and W-phase coil groups. Each of the three lead wires 2u, 2v, and 2w is connected to one end of a different phase coil group, and the other end portion of each phase coil group is electrically connected to a neutral point. Hereinafter, the coil end portion 24a to which the lead wires 2u, 2v, and 2w are connected will be referred to as a lead side coil end portion, and the other coil end portion 24b positioned on the opposite side in the axial direction will be referred to as the non-lead side coil end portion.

The cooling structure 10 for a rotary electric machine of this example embodiment includes a lead side cover member 28a that covers the lead side coil end portion 24a to form a fluid-tight first cooling oil chamber 26a inside, and a non-lead side cover member 28b that covers the non-lead side coil end portion 24b to form a second cooling oil chamber 26b inside. Hereinafter, the two cover members will simply be referred to as the cover members 28 when referred to collectively. This applies to the reference characters denoting other elements as well.

The cover members 28 may be formed by metal casting, or a combination of drawing metal sheet and welding a metal conduit or the like, for example. Also, the cover members 28 are formed as annular members that have generally U-shaped, bracket-shaped, or L-shaped cross-sections so as to cover the entire periphery of the coil end portions 24a and 24b. Furthermore, the cover members 28 are fixed onto the end surfaces 13a and 13b of the stator core 14 via a seal member such as rubber packing, for example. As a result, cooling oil is prevented from leaking out of the first and second cooling oil chambers 26a and 26b at the end surfaces 13a and 13b of the stator core 14.

Referring to FIG. 1, three tabs (only two are shown in FIG. 1) 30 are formed protruding radially outward at uniform positions in the circumferential direction on axial edge portions of the cover members 28. Each tab 30 has a bolt throughhole 32 formed through it. Meanwhile, bolt inserting portions 34 are formed bulging out at positions corresponding to the tabs 30, on the outer peripheral surface of the stator core 14, and bolt inserting holes, not shown, are formed in the axial direction through the inside of these bolt inserting portions 34. Thus, the cover members 28 is fixed in a fluid-tight manner to the stator 12 by assembling the stator 12 and the cover members 28 in the manner shown in FIG. 1, inserting bolts through the bolt inserting portions 34 of the stator core 14 and the two tabs 30 above and below each bolt inserting portion 34, and tightening the bolts with nuts.

An opening 29 that allows the lead wires 2u, 2v, and 2w to pass through is formed in the radially outer peripheral surface of the lead side cover member 28a. The work of electrically connecting the lead wires 2u, 2v, and 2w to the lead side coil end portion 24a may be performed before attaching the lead side cover member 28a to the stator 12, or via the opening 29 after attaching the lead side cover member 28a to the stator 12.

The opening 29 for the lead side cover member 28a may be closed off by a seal member, not shown, to ensure a fluid-tight state while enabling the lead wires 2u, 2v, and 2w to pass through, or it may be used as a cooling oil outlet through which cooling oil that has been supplied to the first cooling oil chamber 26a is discharged, as will be described in detail later.

Referring to FIGS. 1 and 2, a lead side supply path forming portion 36a that bulges radially outward is formed extending in the axial direction on an outer peripheral portion of the lead side cover member 28a. This lead side supply path forming portion 36a is formed longer in the axial direction than the portion that forms the first cooling oil chamber 26a in the lead side cover member 28a. The end portion of the lead side supply path forming portion 36a either contacts the stator 12 or spaced apart from stator 12, and extends to the axial center of the outer peripheral surface of the stator core 14.

A cooling oil supply port 38 is formed in an axial end surface of the lead side supply path forming portion 36a, i.e., in an axial end surface of the lead side cover member 28a. Also, a first cooling oil supply path 40a that communicates the first cooling oil chamber 26a with the cooling oil supply port 38 is formed in the lead side supply path forming portion 36a. A lead side supply path portion 42a that extends in the axial direction and opens at an end portion is also formed in the lead side supply path forming portion 36a. The lead side supply path portion 42a is communicated with the first cooling oil supply path 40a and the cooling oil supply port 38. This lead side supply path portion 42a forms a portion of a second cooling oil supply path 40b that will be described later.

Meanwhile, a non-lead side supply path forming portion 36b that bulges radially outward is formed extending in the axial direction on an outer peripheral portion of the non-lead side cover member 28b. This non-lead side supply path forming portion 36b is formed longer in the axial direction than the portion that forms the second cooling oil chamber 26b in the non-lead side cover member 28b. The end portion of the non-lead side supply path forming portion 36b either contacts the stator 12 or is spaced apart from the stator 12, and extends to the axial center of the outer peripheral surface of the stator core 14.

The non-lead side supply path forming portion 36b of the non-lead side cover member 28b is configured to continue on from the lead side supply path forming portion 36a of the lead side cover member 28a so as to form a single protrusion when the cooling structure 10 is assembled to the stator 12. That is, an axial end portion (i.e., the lower end portion in FIG. 1, and the left side end portion in FIG. 2) 37a of the lead side supply path forming portion 36a and an axial end portion (i.e., the upper end portion in FIG. 1, and the right side end portion in FIG. 2) 37b of the non-lead side supply path forming portion 36b connect together at the outside of the outer peripheral surface of the stator core 14.

The second cooling oil supply path 40b for supplying cooling oil into the second cooling oil chamber 26b is formed in the non-lead side supply path forming portion 36b of the non-lead side cover member 28b. This second cooling oil supply path 40b includes a non-lead side supply path portion 42b formed extending in the axial direction inside the non-lead side supply path forming portion 36b, and opens at an axial end portion of the non-lead side supply path forming portion 36b. Therefore, when the cooling structure 10 formed by the cover members 28 is assembled to the stator 12, the axial end portions of the lead side supply path forming portion 36a and the non-lead side supply path forming portion 36b are connected via an appropriate seal member 44, such as an O-ring, such that the lead side supply path portion 42a and the non-lead side supply path portion 42b that form the second cooling oil supply path are connected together. As a result, the second cooling oil chamber 26b inside the non-lead side cover member 28b becomes communicated with the cooling oil supply port 38 via the second cooling oil supply path 40b (including 42a and 42b) and a portion of the first cooling oil supply path 40a.

As described above, in this example embodiment, having the end surfaces of the lead side supply path forming portion 36a and the non-lead side supply path forming portion 36b be connected together by being pressing together via the seal member 44 reliably prevents cooling oil from leaking at the connecting portion of the lead side supply path portion 42a and the non-lead side supply path portion 42b that form the second cooling oil supply path 40b.

In the cooling structure 10 of this example embodiment, the supply path forming portions are formed in two locations separated in the radial direction, as described above. Corresponding to this, two of the cooling oil supply ports 38 are also formed in the axial end surface of the lead side cover member 28a. In this way, cooling oil is able to be supplied from the two cooling oil supply ports 38 into the first and second cooling oil chambers 26a and 26b, so cooling oil can be supplied and filled into the cooling oil chambers 26a and 26b more quickly and reliably. However, the number of cooling oil supply ports 38 is not limited to two, i.e., one or three or more may be provided.

The pair of cooling oil supply ports 38 and the first and second cooling oil supply paths 40a and 40b that are communicated with these cooling oil supply ports 38 are provided in positions vertically below the stator center axis X when the rotary electric machine is mounted in a vehicle such that the stator center axis X lies in the horizontal direction. In contrast, the opening 29 through which the lead wires 2u, 2v, and 2w pass may be formed in the lead side cover member 28a in a position generally facing, in the radial direction, the pair of cooling oil supply ports 38. As a result, when the opening 29 is used as a cooling oil outlet, relatively low temperature cooling oil is supplied from a lower portion of the cooling structure 10 to the cooling oil chambers 26a and 26b, and cooling oil of which the temperature has risen due to cooling the coil end portions 24a and 24b can be discharged from the opening 29 that is positioned in an upper portion of the cooling oil chamber 26, thereby further improving the cooling performance with respect to the coil 16.

Figure 3:
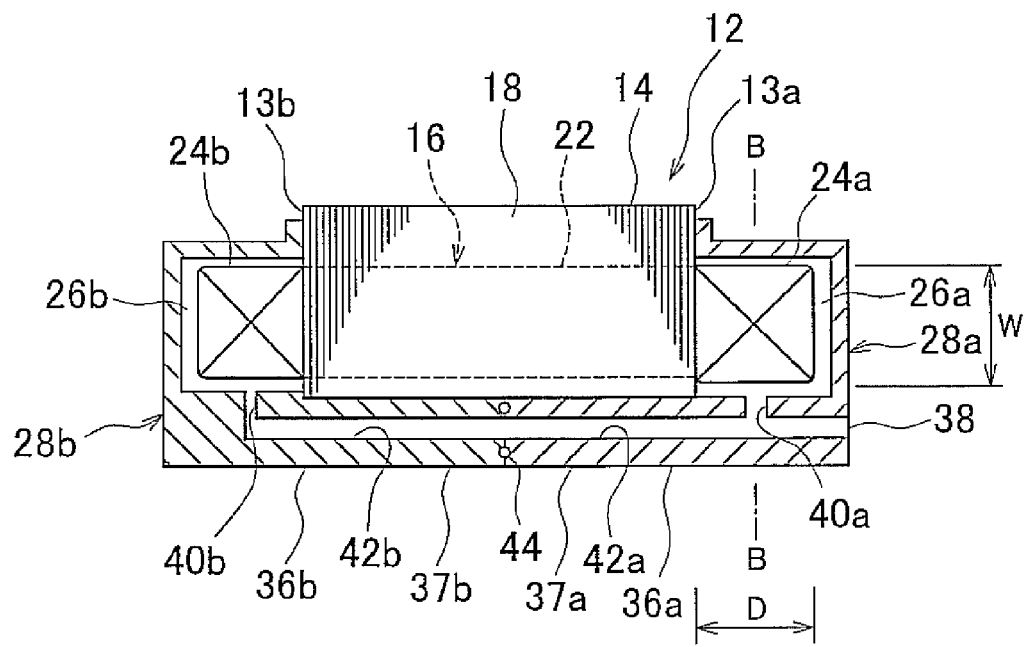
FIG. 3 is a view of an example in which the inside diameter dimensions of first and second cooling oil supply paths are made different.

FIG. 3 is a view of an example in which the inside diameter dimensions of first and second cooling oil supply paths are made different. In the example shown in FIG. 3, the lead side coil end portion 24a is formed larger than the non-lead side coil end portion 24b. That is, the length D in the axial direction and the width W in the radial direction of the lead side coil end portion 24a are larger dimensions than those of the non-lead side coil end portion 24b. Accordingly, the first cooling oil chamber 26a is formed with a larger cooling oil volume than the second cooling oil chamber 26b. Accordingly, cooling performance that is sufficient and equivalent to that of the non-lead side coil end portion 24b is also able to be ensured for the lead side coil end portion 24a that generates a comparatively larger amount of heat than the non-lead side coil end portion 24b.

Also, the inside diameter of the portion near the cooling chamber of the first cooling oil supply path 40a is formed larger than the inside diameter of the portion near the cooling chamber of the second cooling oil supply path 40b. Accordingly, a comparatively larger amount of cooling oil supplied from the cooling oil supply port 38 can be supplied to the first cooling oil chamber 26a. The amounts of cooling oil supplied to the first and second cooling oil chambers 26a and 26b may be adjusted by making the supply path inside diameter of the cooling oil supply path different with the first cooling oil chamber 26a and the second cooling oil chamber 26b in this way. In the description above, only a portion of the second cooling oil supply path 40b is formed narrower than the first cooling oil supply path 40a, but the entire second cooling oil supply path may also be formed relatively narrower.

Figure 4:
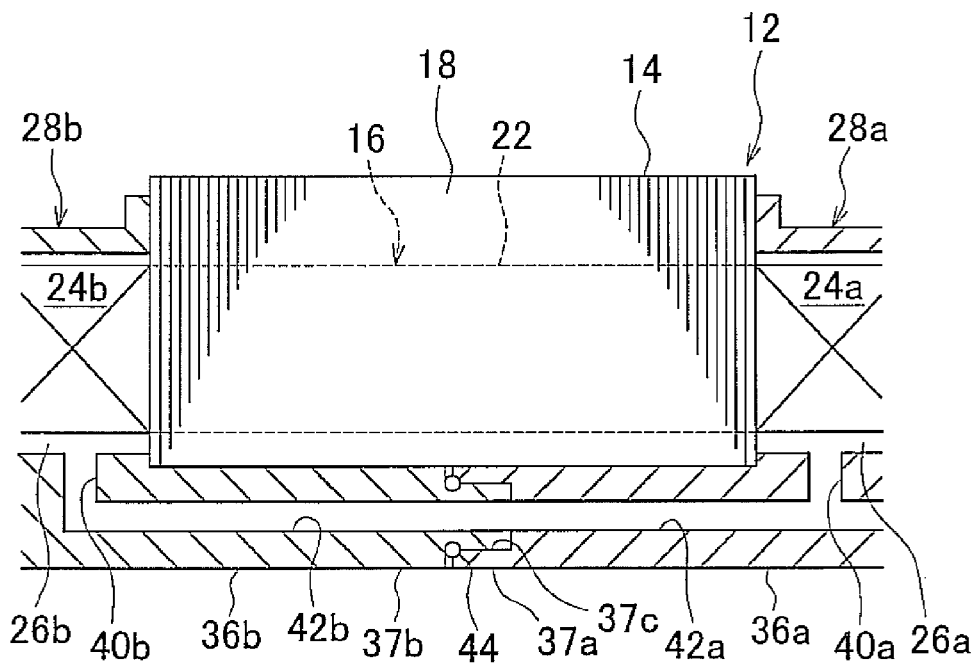
FIG. 4 is a view of another mode related to the connection of the second cooling oil supply path.
Figure 5:
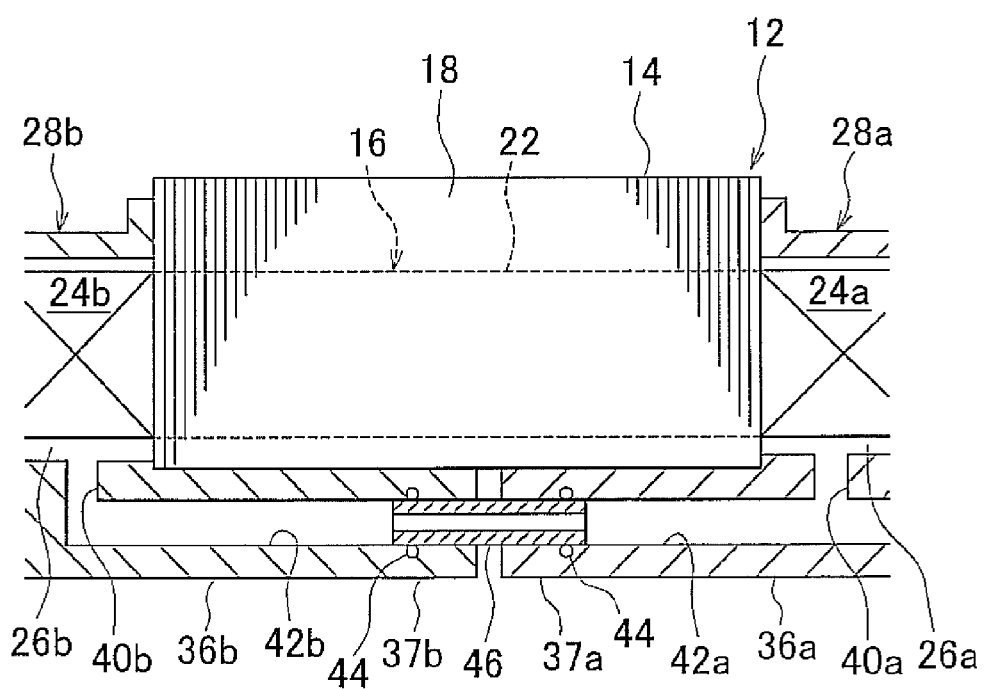
FIG. 5 is a view of still another mode related to the connection of the second cooling oil supply path.

FIGS. 4 and 5 are views of modified examples of the connecting portion of the lead side supply path portion 42a and the non-lead side supply path portion 42b. In the modified example shown in FIG. 4, the end portion 37b of the non-lead side supply path forming portion 36b of the non-lead side cover member 28b is formed narrow, while a recessed portion 37c is formed inside the end portion 37a of the lead side supply path forming portion 36a of the lead side cover member 28a. This recessed portion 37c is formed having an axial length and an inside diameter that enables the narrow end portion 37b of the non-lead side supply path forming portion 36b to engage with it by press-fitting. The engagably connected connecting portion is then sealed by an appropriate seal member 44 such as an O-ring, for example. Engagably connecting the lead side supply path portion 42a and the non-lead side supply path portion 42b together by press-fitting and then sealing the connecting portion with a seal member 44 in this way makes it possible to more reliably prevent cooling oil from leaking at the connecting portion.

In the modified example shown in FIG. 5, the axial length is set shorter than it is in the example shown in FIG. 2, such that there is a gap between the end portions 37a and 37b of the supply path forming portions 36a and 36b. These supply path forming portions 36a and 36b are then connected together by a hollow connecting conduit 46 that has been press-fit at both ends into the lead side supply path portion 42a and the non-lead side supply path portion 42b. Then appropriate seal members 44, such as O-rings, for example, are arranged at the outer periphery near both end portions of the connecting conduit 46 to provide a seal. Connecting the supply path forming portions 36a and 36b together with the connecting conduit 46 and providing a seal by the seal members 44 in this way makes it possible to more reliably prevent cooling oil from leaking at the connecting portion. In addition, assembly of the cooling structure 10 can be improved because any error in the circumferential positions and axial lengths of the two supply path forming portions 36a and 36b can be absorbed by interposing the connecting conduit 46.

Figure 6:
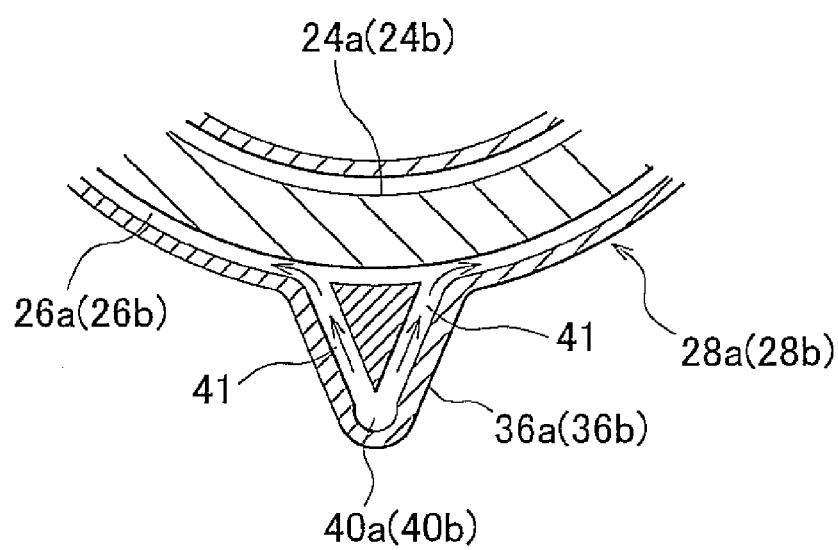
FIG. 6 is a sectional view taken along line B-B in FIG. 2.

FIG. 6 is a sectional view taken along line B-B in FIG. 2. The first cooling oil supply path 40a that is communicated with the first cooling oil chamber 26a is formed diagonal to, not orthogonal to, the outer peripheral surface of the radially outer side of the lead side coil end portion 24a, inside the lead side supply path forming portion 36a that is the portion near the cooling oil chamber. More specifically, the first cooling oil supply path 40a includes two branch paths 41 that branch off out into a general V-shape from the axially extending portion and connect to the first cooling oil chamber 26a. Therefore, cooling oil that has been delivered from the branch paths 41 of the first cooling oil supply path 40a to the first cooling oil chamber 26a is able to flow with little resistance along the outer peripheral surface on the radially outer side of the lead side coil end portion 24a, thereby enabling cooling oil to be supplied smoothly to the first cooling oil chamber 26a. The second cooling oil supply path 40b that supplies cooling oil to the second cooling oil chamber 26b is similar, so illustrations and a description thereof will be omitted.

Figure 7:
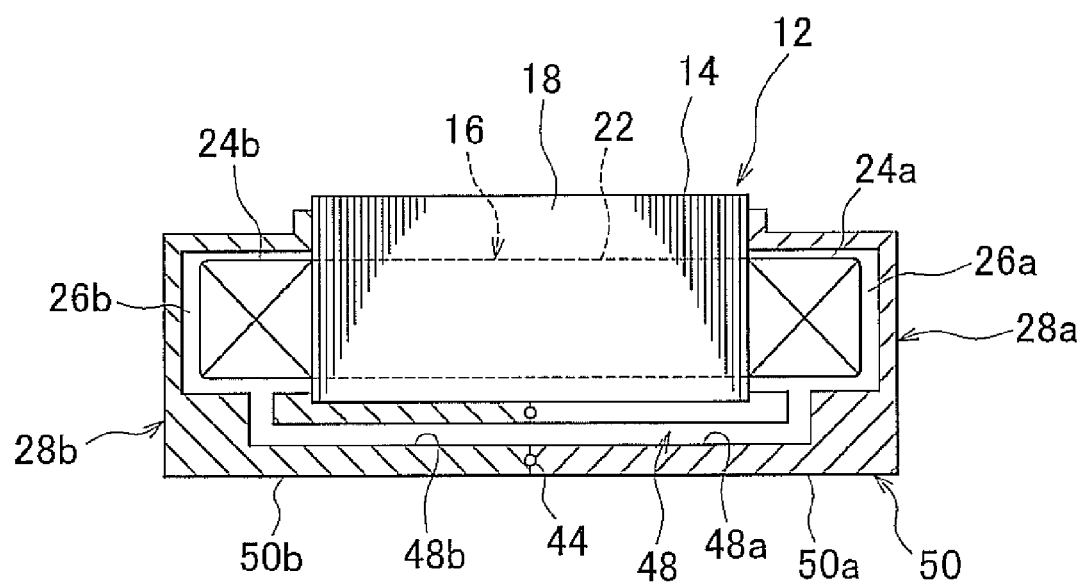
FIG. 7 is a sectional view taken along line C-C in FIG. 1.

FIG. 7 is a sectional view taken along line C-C in FIG. 1. The cooling structure 10 in this example embodiment has a communicating path 48 that communicates the first cooling oil chamber 26a formed around the lead side coil end portion 24a with the second cooling oil chamber 26b formed around the non-lead side coil end portion 24b. The communicating path 48 is formed inside a communicating path forming portion 50 that is formed bulging out radially outward and extending in the axial direction, in the outer peripheral portion of the cover members 28, as shown in FIG. 1.

In this example embodiment, regarding the cover members 28, two communicating path forming portions 50 are provided at intervals in the circumferential direction between the two supply path forming portions 36a and 36b, and a communicating path 48 is formed in each communicating path forming portion 50. Forming the communicating path 48 in this position enables the communicating path 48 to be arranged on the vertically lower side, just like the cooling oil supply path 40, when the rotary electric machine is arranged such that the center axis X lies in the horizontal direction.

The communicating path 48 is formed by a lead side communicating path portion 48a and a non-lead side communicating path portion 48b being connected together. The connection between the end portion of a lead side communicating path forming portion 50a that includes the lead side communicating path portion 48a and a non-lead side communicating path forming portion 50b that includes the non-lead side communicating path portion 48b is the same as it is with the supply path forming portions 36a and 36b described with reference to FIGS. 2, 4, and 5, so a description thereof would be redundant and will therefore be omitted.

Communicating the first and second cooling oil chambers 26a and 26b together via the communicating path 48 in this way enables the amount and pressure of the cooling oil to be equalized between the cooling oil chambers by coolant flowing through the communicating path 48, even if the pressures and/or the amounts of cooling oil supplied to the cooling oil chambers are different. As a result, equivalent cooling performance is able to be ensured and maintained for the lead side coil end portion 24a and the non-lead side coil end portion 24b.

Figure 8:
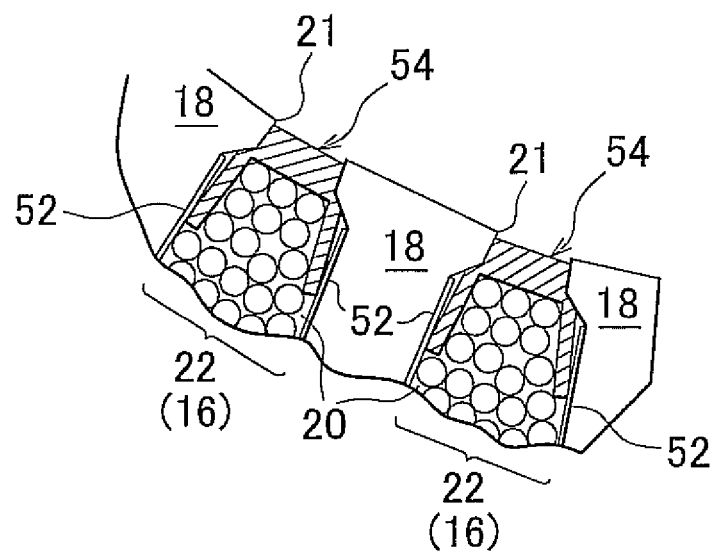
FIG. 8 is an enlarged view of the seal of a slot inner peripheral opening of the stator.
Figure 9:
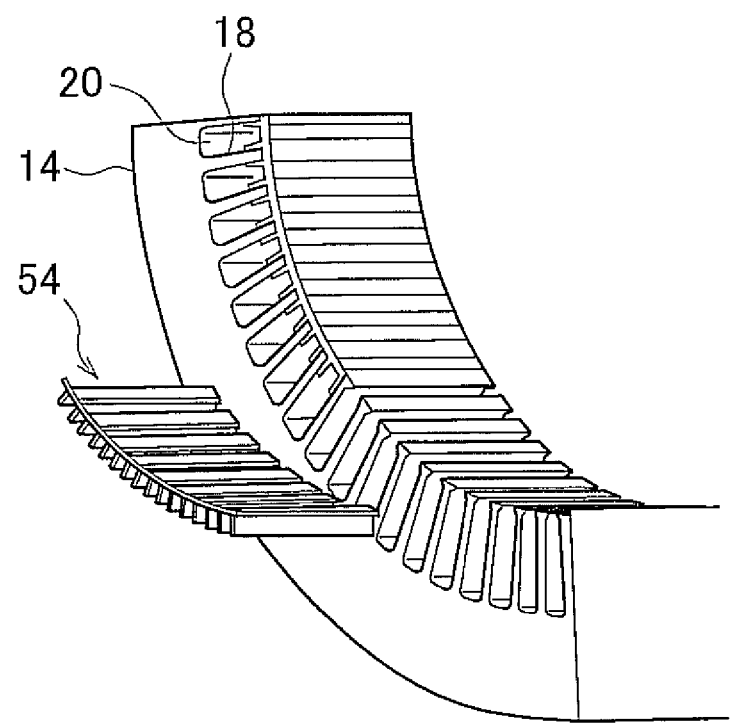
FIG. 9 is a view of a seal member inserted into the slot inner peripheral opening.

Next, the seal of the slot inner peripheral portion of the stator 12 will be described with reference to FIGS. 8 and 9. FIG. 8 is an enlarged view of the seal of the slot inner peripheral opening of the stator 12, and FIG. 9 is a view of a seal member inserted into the slot inner peripheral opening. The coil is not shown in FIG. 9.

As shown in FIG. 8, the slots 20 formed in the teeth 18 are open, extending in the axial direction, on the inner peripheral portion of the stator core 14. The slot portions 22 of the coil 16 are housed surrounded by sheet-shaped insulating members 52, for example, inside the slots 20.

The openings 21 on the radial inside of the slots 20 are closed in a fluid-tight manner by seal members 54, each of which is formed by a resin molded part, for example. The seal members 54 are fixed by, for example, being inserted from the axial direction into the radial openings 21 of the slots 20 and adhered thereto, as shown in FIG. 9. Also, all of the openings 21 are sealed off by the plurality of the seal members 54 that are divided in the circumferential direction, being attached to the entire inner periphery of the stator core 14. Here, the seal members 54 are attached to the slot openings 21 after the coil 16 has been arranged in the slots 20, but in the case of a segment coil, the seal members 54 may be attached to the stator core 14 before the coil 16 is attached.

Even if cooling oil flows into the gaps between the coil slot portions in the slots 20 from at least either of the cooling oil chambers 26a and 26b, sealing the radial openings 21 of the slots 20 by the seal members 54 in this way makes it possible to prevent this cooling oil from leaking out to the inner periphery of the stator 12, and thus makes it possible to prevent cooling oil that has leaked out from contacting the rotor inside the stator 12 and impeding rotation.

In this example embodiment, the seal members provide a seal member by being inserted into the slot openings from the axial direction, but the manner in which the slot openings 21 are sealed is not limited to this. For example, after the coil is wound on the teeth 18, putty may be worked (i.e., kneaded) into the slot openings 21, for example, to prevent oil from leaking, or the slot openings 21 may be closed off by adhering a thin adhesive sheet to the inner periphery of the stator core 14. Alternatively, cooling oil may be prevented from flowing into the slots 21 from the axial openings of the slots 20 by interposing seal members between the cover members 28 and the stator core 14.

Continuing on, the operation of the rotary electric machine provided with the cooling structure 10 formed as described above will be described.

When three-phase alternating current (AC) voltage is applied to the coil 16 via the lead wires 2u, 2v, and 2w, the teeth 18 around which the coil 16 is wound become excited, such that a rotating magnetic field is created inside the stator 12. This rotating magnetic field in turn drivingly rotates the rotor inside the stator 12.

The current passing through the coil 16 generates heat in the coil 16, causing the temperature of the coil 16 to rise. If left this way, the insulating performance will decrease. More particularly, discharge tends to occur between different phase coils where the electrical potential is large at the coil end portion 24. However, in the cooling structure 10 of this example embodiment, the cooling oil chambers 26 are formed covering the entire periphery of the coil end portion 24. These cooling chambers 26 are filled with cooling oil supplied from the cooling oil supply port 38. Therefore, the coil end portion 24 is efficiently cooled by the cooling oil contacting the entire surface of the inner and outer surfaces in the radial direction and the end surfaces in the axial direction. Thus, with the rotary electric machine provided with the cooling structure 10 of this example embodiment, the insulating performance of the coil 16 is able to be maintained or improved. As a result, the rotary electric machine is able to be made smaller by increasing the current density of the current that flows through the coil 16, and cost is able to be reduced by eliminating the insulating paper that had been sandwiched between different phase coils at the coil end portions.

The cooling oil that has risen in temperature as a result of cooling the coil end portions 24 is discharged outside from the lead opening 29, for example, and passed through an oil cooler or the like where it releases heat such that its temperature lowers. Then the cooling oil is circulated by an oil pump to the cooling oil supply port 38.

Also, with the cooling structure 10 of this example embodiment, the cooling oil supply port 38 for supplying cooling oil to the first and second cooling oil chambers 26a and 26b via the first and second cooling oil supply paths 40a and 40b is formed only in the lead side cover member 28a on one side in the axial direction. Therefore, the work of connecting the coolant supply conduit in a fluid-tight manner to the cooling oil supply port 38 of the rotary electric machine that includes this cooling structure 10 can be performed from one side in the axial direction, which improves both assemblability of the rotary electric machine and mountability when mounting this kind of rotary electric machine to a vehicle.

The cooling structure of the rotary electric machine according to the invention is not limited to the example embodiment described above, i.e., various improvements and modifications are possible.

For example, with the cooling structure 10 described above, the cooling oil supply port for supplying cooling oil to the first and second cooling oil chambers 26a and 26b is provided in the lead side cover member 28a itself, but the invention is not limited to this. That is, a cooling oil supply port that is separate from the cover member may be provided on the same side as the lead side cover member, and this cooling oil supply port may be pipe-connected with the first and second cooling oil supply paths.

Also, in the description above, the cooling oil supply port is formed in the lead side cover member 28a and cooling oil is supplied to the first and second cooling oil chambers 26a and 26b, but the invention is not limited to this. That is, cooling oil may be supplied to the first cooling oil chamber from a cooling oil supply port formed in the lead side cover member 28a, and cooling oil may be supplied to the second cooling oil chamber from a cooling oil supply port formed in the non-lead side cover member 28b.

Figure 10:
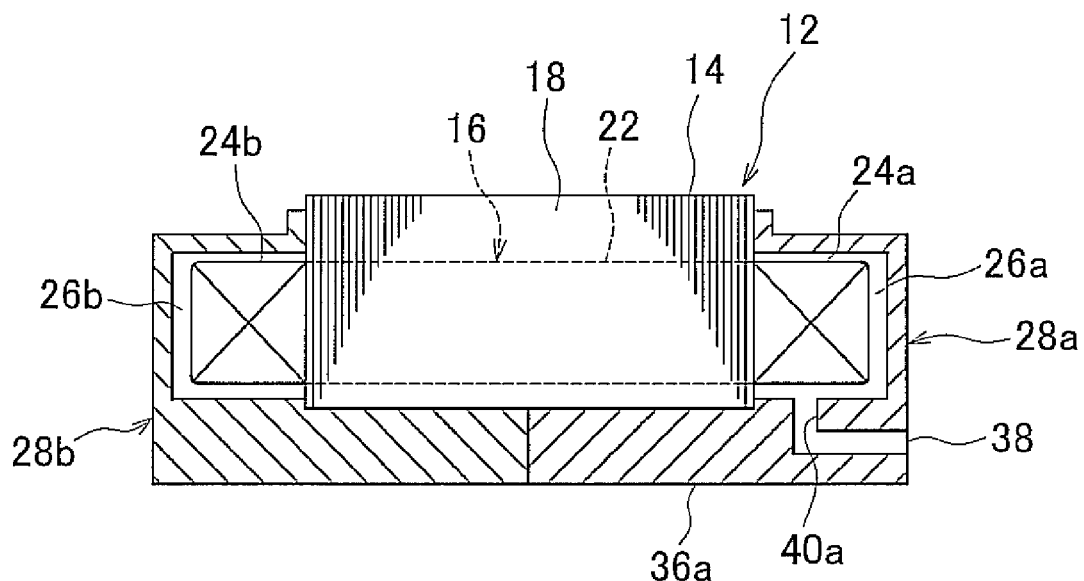
FIG. 10 is a view of a cooling structure for a rotary electric machine according to a modified example of the first embodiment.
Figure 11:
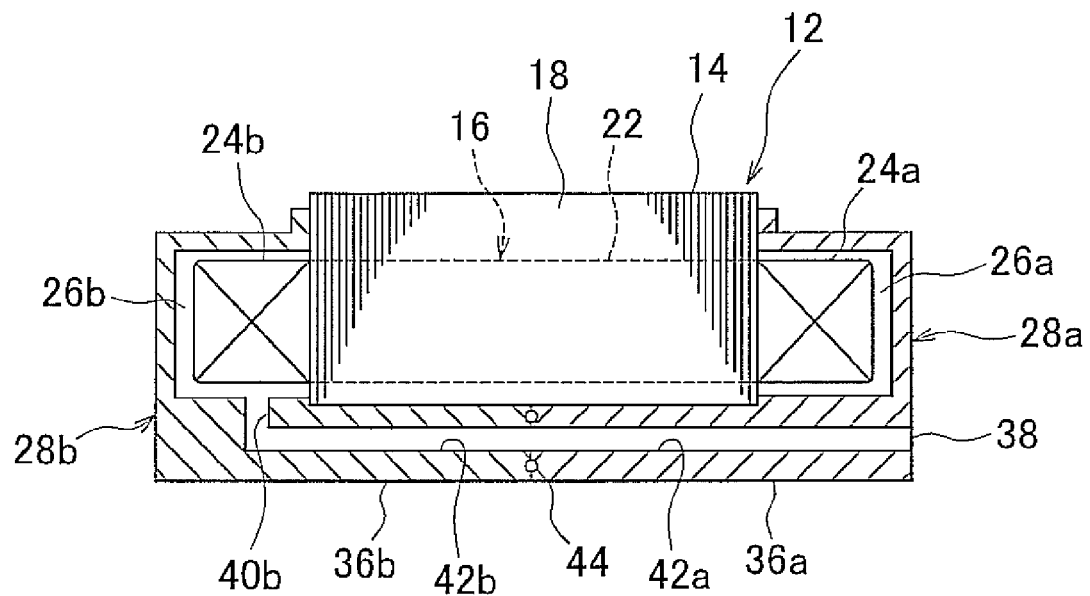
FIG. 11 is a view of a cooling structure for a rotary electric machine according to another modified example of the first embodiment.

Furthermore, in the description above, the first and second cooling oil supply paths 40a and 40b are communicated with one cooling oil supply port 38, but the invention is not limited to this. That is, one of two cooling oil supply ports 38 may be connected to the first cooling oil chamber 26a via the first cooling oil supply path 40a, as shown in FIG. 10, or the other cooling oil supply port 38 may be connected to the second cooling oil chamber 26b via the second cooling oil supply path 40b, as shown in FIG. 11.

Next, a second example embodiment of the invention will be described. Constituent parts of this second example embodiment that are the same as those of the first example embodiment will be denoted by the same reference characters as they are in the first example embodiment described above, and detailed descriptions of those constituent parts will be omitted.

Figure 12:
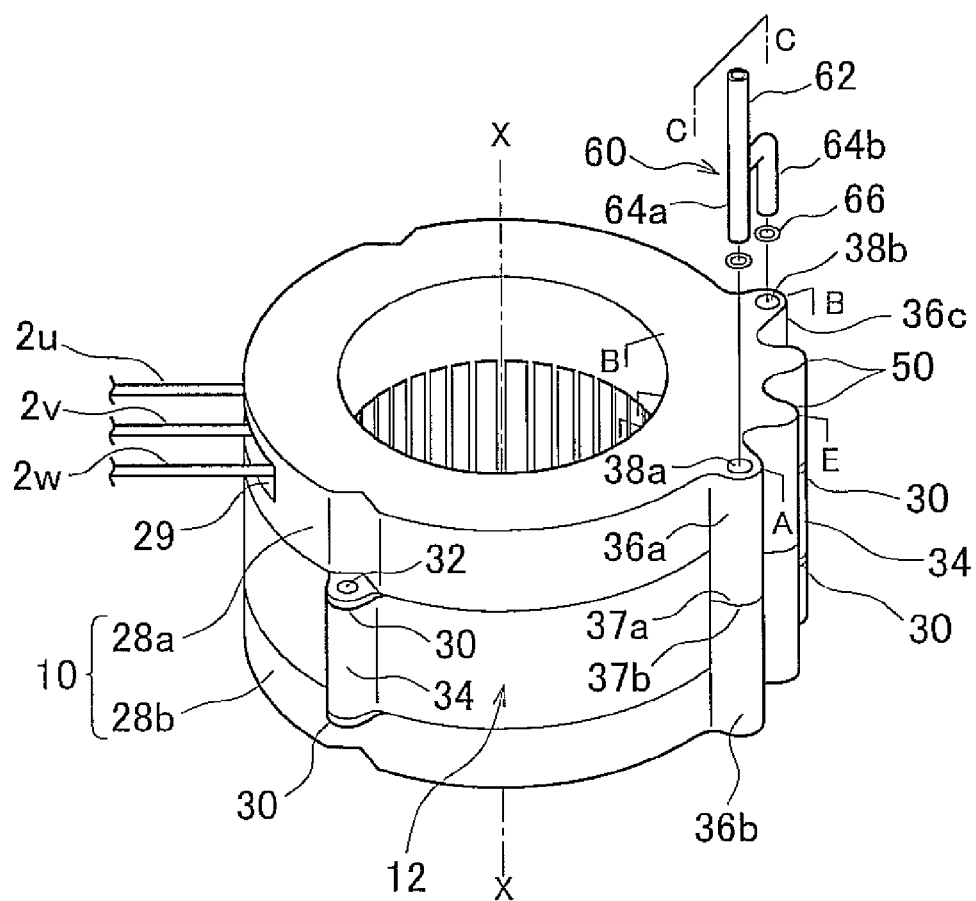
FIG. 12 is a perspective view of a stator provided with a cooling structure according to a second example embodiment of the invention.
Figure 13:
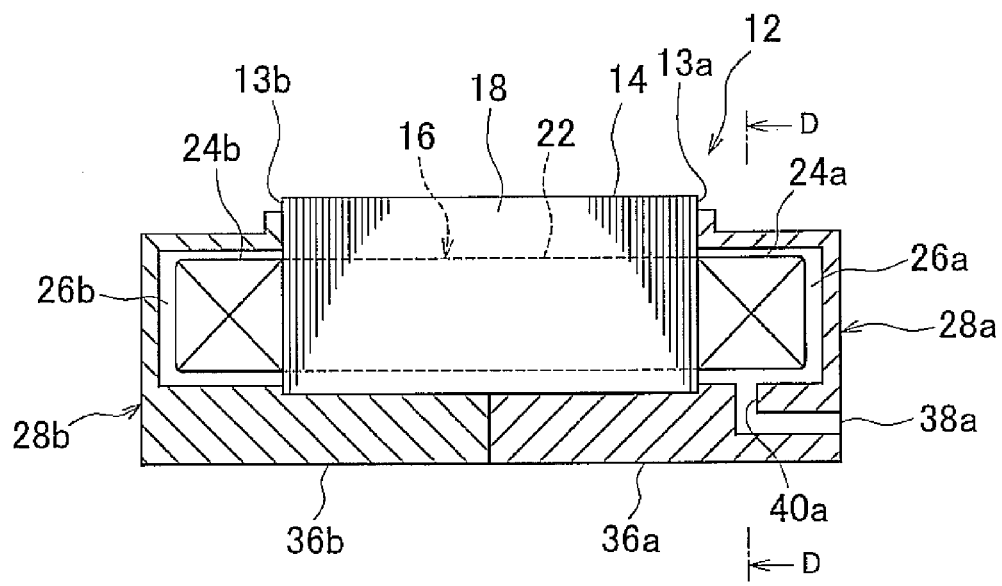
FIG. 13 is a sectional view taken along line A-A in FIG. 12.
Figure 14:
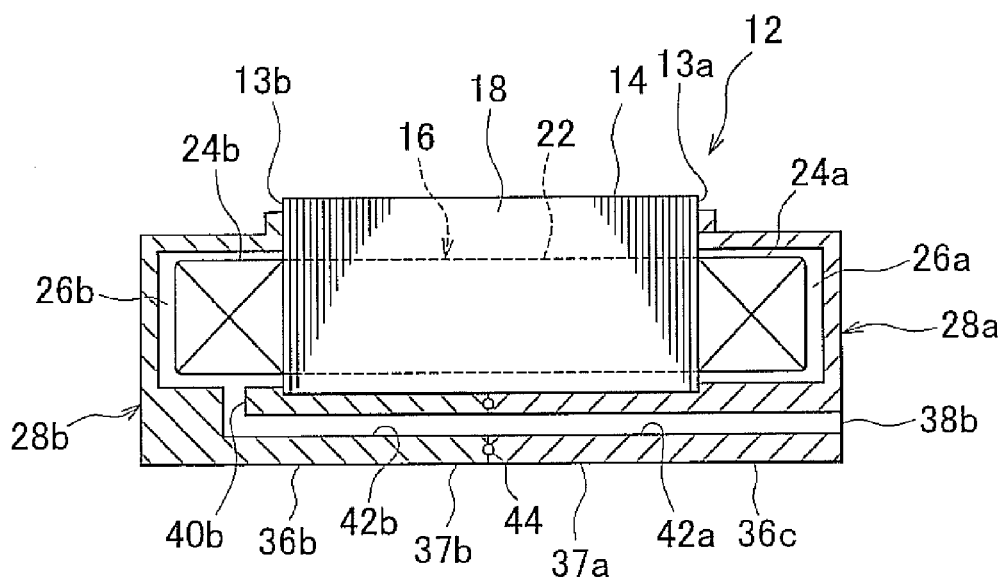
FIG. 14 is a sectional view taken along line B-B in FIG. 12.

FIG. 12 is a perspective view of a cooling structure 10 of a rotary electric machine according to this example embodiment that has been assembled to a stator 12 for a rotary electric machine. FIG. 13 is a sectional view taken along line A-A in FIG. 12, and FIG. 14 is a sectional view taken along line B-B in FIG. 12. Here, an axis X in FIG. 12 is the center axis of the stator and stator core that are formed in cylindrical shapes. The direction along this center axis X will be referred to as the axial direction, the direction orthogonal to this center axis X will be referred to as the radial direction, and the direction along the circumference of a circle that is drawn on a plane orthogonal to the center axis X and is centered on a point on the center axis X will be referred to as the circumferential direction. Also, in FIGS. 13 and 14, only a cross-section in the axial direction on one side in the radial direction, in the circumferential direction of the cylindrical stator 12, i.e., only a cross-section in the axial direction of the vertically lower half when and the rotary electric machine is mounted in a vehicle with the center axis X lying in the horizontal direction, is shown.

As shown in FIG. 12, a stator 12 includes a cylindrical stator core 14, and a coil 16 provided on an inner peripheral portion of the stator core 14. The stator core 14 is formed by stacking together a plurality of magnetic steel sheets such as silicon steel sheets, for example, that have been stamped out in a ring shape, and integrally connecting these sheets together by a method such as crimping, welding, adhesion, or fitting. An IPM type rotor, not shown, is rotatably provided inside the stator 12, and this rotor is rotatably driven by a rotating magnetic field that is electrically created inside the stator 12.

As shown in FIG. 12, the cooling structure 10 of a rotary electric machine according to this example embodiment includes a lead side cover member 28a that covers a lead side coil end portion 24a to form a fluid-tight first cooling oil chamber 26a inside, a non-lead side cover member 28b that covers a non-lead side coil end portion 24b to form a second cooling oil chamber 26b inside, and a cooling oil supply conduit 60 that will be described in detail later. Hereinafter, the two cover members will simply be referred to as the cover members 28 when referred to collectively. This applies to the reference characters denoting other elements as well.

A long bolt is used for the bolt that is inserted through the tabs 30 and the bolt inserting portions 34. The cover members 28a and 28b may be assembled to the stator core 14, and the stator 12 may be fixed inside the case, by screwing the tip end of the bolt into a female screw hole formed in the inner wall surface of a case, not shown, that houses the rotary electric machine, and then tightening the bolt.

Referring to FIGS. 12 and 13, a lead side supply path forming portion 36a that bulges radially outward is formed extending in the axial direction on an outer peripheral portion of the lead side cover member 28a. This lead side supply path forming portion 36a is formed longer in the axial direction than the portion that forms the first cooling oil chamber 26a in the lead side cover member 28a. The end portion of the lead side supply path forming portion 36a either contacts the stator 12 or spaced apart from stator 12, and extends to the axial center of the outer peripheral surface of the stator core 14. However, as will be described later, only a first cooling oil supply path that supplies cooling oil to the first cooling oil chamber 26a is formed inside the lead side supply path forming portion 36a, so the lead side supply path forming portion 36a may be formed having the same length in the axial direction as the portion in which the first cooling oil chamber 26a is formed. In this case, a bulging portion corresponding to the lead side supply path forming portion 36a does not need to be provided on the non-lead side cover member 28b.

A lead side second supply path forming portion 36c that bulges radially outward is formed extending in the axial direction at a position a predetermined distance away from the lead side supply path forming portion 36a in the circumferential direction, on an outer peripheral portion of the lead side cover member 28a, as shown in FIGS. 12 and 14. This lead side second supply path forming portion 36c is formed longer in the axial direction than the portion that forms the first cooling oil chamber 26a, in the lead side cover member 28a, and extends to a center position in the axial direction of the outer peripheral surface of the stator core 14 either contacting the stator 12 or spaced apart from the stator 12.

The non-lead side supply path forming portion 36b is configured to connect with the lead side second supply path forming portion 36c of the lead side cover member 28a so as to form a single protrusion when the cooling structure 10 is assembled to the stator 12. That is, an axial end portion (i.e., the lower end portion in FIG. 12, and the left side end portion in FIG. 14) 37a of the lead side second supply path forming portion 36c and an axial end portion (i.e., the upper end portion in FIG. 12, and the right side end portion in FIG. 13) 37b of the non-lead side supply path forming portion 36b connect together by press-fitting on the outside of the outer peripheral surface of the stator core 14. As a result, a second supply path forming portion is formed by the non-lead side supply path forming portion 36b and the lead side second supply path forming portion 36c.

A second cooling oil supply path 40b that is communicated with the second cooling oil chamber 26b is formed extending in the axial direction inside the second supply path forming portion. The second cooling oil supply path 40b is formed by the lead side supply path portion 42a and the non-lead side supply path portion 42b being connected together. Then this connecting portion is then sealed by an appropriate seal member 44 such as an O-ring, for example. As a result, it is possible to reliably prevent cooling oil from leaking from the connecting portion.

The second cooling oil supply path 40b is formed open in an end surface in the axial direction of the lead side second supply path forming portion 36c, i.e., in the end surface in the axial direction of the lead side cover member 28a where a first cooling oil supply port 38a is formed open. This opening serves as a second cooling oil supply port 38b for supplying cooling oil to the second cooling oil chamber 26b. In other words, the first cooling oil supply port 38a and the second cooling oil supply port 38b are formed separately in the same direction in the lead side cover member 28a.

In this example embodiment, an example is described in which the first and second cooling oil supply ports 38a and 38b are formed in the lead side cover member 28a, but the invention is not limited to this. That is, both of the supply ports may also be formed in the non-lead side cover member 28b.

Figure 15A:
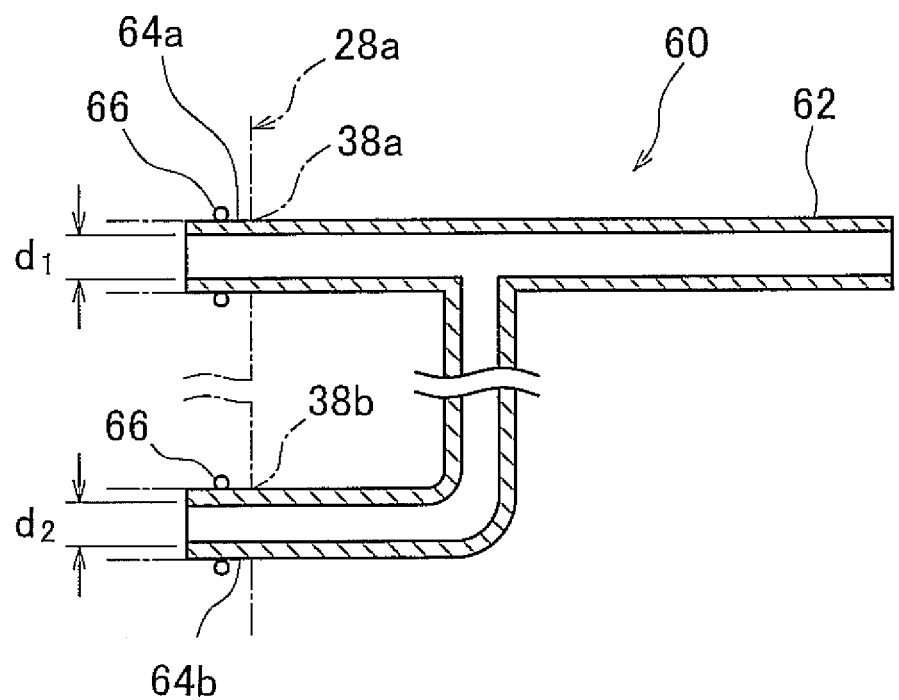
FIG. 15A is an expanded sectional view taken along line C-C of a cooling oil supply conduit in FIG. 12.

As shown in FIG. 12, a cooling oil supply conduit 60 is connected to the first and second cooling oil supply ports 38a and 38b formed in the lead side cover member 28a. This cooling oil supply conduit 60 is a branching conduit that is formed in the shape of a lower case letter h, as shown in FIG. 15A, and is configured to discharge cooling oil received from a single one end portion 62 from two other end portions 64a and 64b. One of the other end portions 64a is connected by press-fitting or the like to the first cooling oil supply port 38a, and the other of the other end portions 64b is connected by press-fitting or the like to the second cooling oil supply port 38b. Each connecting portion is sealed by an appropriate seal member 66 such as an O-ring, for example. As a result, the cooling oil supply port 38 and the cooling oil supply conduit 60 are connected in a fluid-tight manner, such that cooling oil is reliably prevented from leaking out.

Here, the inside diameter d1 of the one other end portion 64a that is connected to the first cooling oil supply port 38a may be different from the inside diameter d2 of the one other end portion 64b that is connected to the second cooling oil supply port 38b. More specifically, the inside diameter d2 may be formed smaller than the inside diameter d1. Accordingly, the amount of cooling oil supplied to each of the first and second cooling oil chambers 26a and 26b is able to be adjusted as desired. For example, if the lead side coil end portion 24a is formed larger than the non-lead side coil end portion 24b, the amount of cooling oil supplied to the first cooling oil chamber 26a may be increased by forming the inside diameter d1 of the one other end portion 64a comparatively larger, as described above, in order to relatively increase the cooling performance of the lead side coil end portion 24a.

This may also be performed for at least one of the first and second cooling oil supply ports 38a and 38b, and the first and second cooling supply paths 40a and 40b. That is, the opening diameters of the first and second cooling oil supply ports 38a and 38b may be made different, or the flow path cross-sections may be made different for at least a portion of the first and second cooling oil supply paths 40a and 40b. This is may be performed instead of, or in combination with, making the conduit inside diameters of the cooling oil supply conduit 60 different.

Figure 15B:
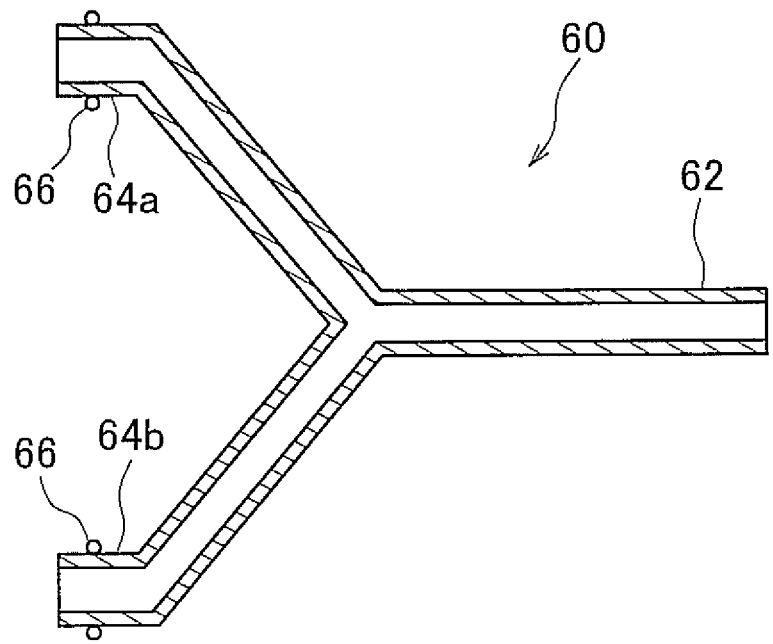
FIG. 15B is an expanded sectional view similar to FIG. 15A, of another example of the cooling oil supply conduit.

In this example embodiment, the cooling oil supply conduit 60 that is shaped like a lower case letter h is used, but the invention is not limited to this. For example, a cooling oil supply conduit formed by generally Y-shaped branch conduits may also be used, as shown in FIG. 15B. Having this kind of shape makes it possible to have cooling oil that has been received from the one end 62 flow branching off evenly to the two other end portions 64a and 64b, which is useful for supplying equal amounts of cooling oil to the first and second cooling oil chambers 62a and 26b. Also, in the description above, the cooling oil supply conduit 60 is a branching conduit, but the invention is not limited to this. That is, separate cooling oil supply conduits may be connected to the first and second cooling oil supply ports 38a and 38b. In this case, the amount of cooling oil that is supplied to the separate cooling oil supply conduits may be adjusted for each cooling oil supply conduit.

Figure 16:
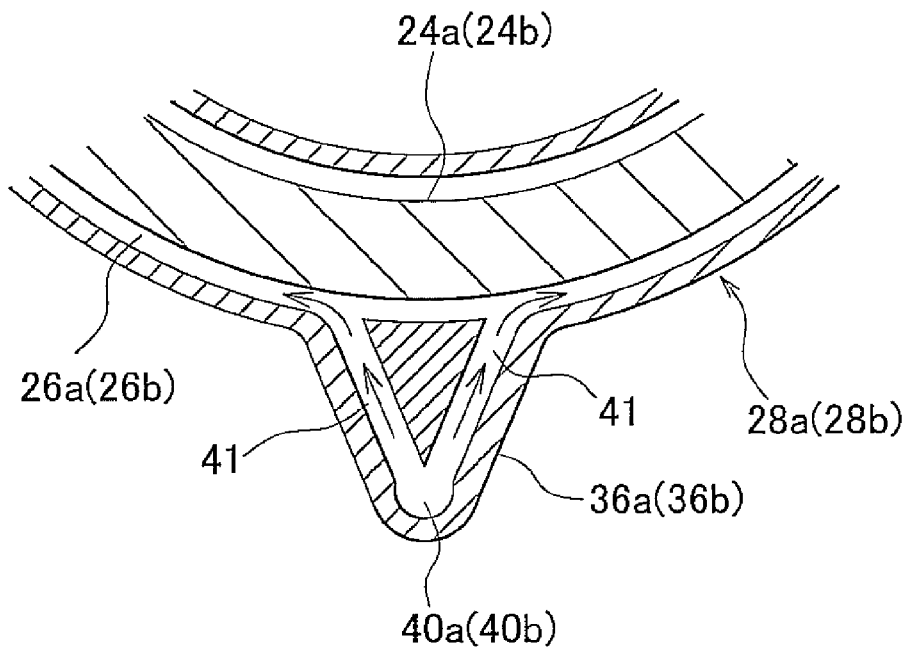
FIG. 16 is a sectional view taken along line D-D in FIG. 13.

FIG. 16 is a sectional view taken along line D-D in FIG. 13. The first cooling oil supply path 40a includes two branch flow paths 41 that branch off out into a general V-shape, such that the path along which cooling oil enters the first cooling oil chamber 26a is diagonal, not orthogonal, with respect to the outer peripheral surface of the radially outer side of the lead side coil end portion 24a. Therefore, cooling oil delivered from the branch paths 41 of the first cooling oil supply path 40a to the first cooling oil chamber 26a is able to flow with little resistance along the outer peripheral surface on the radially outer side of the lead side coil end portion 24a, thereby enabling cooling oil to be supplied smoothly to the first cooling oil chamber 26a. The second cooling oil supply path 40b that supplies cooling oil to the second cooling oil chamber 26b is similar, so illustrations and a description thereof will be omitted.

Figure 17:
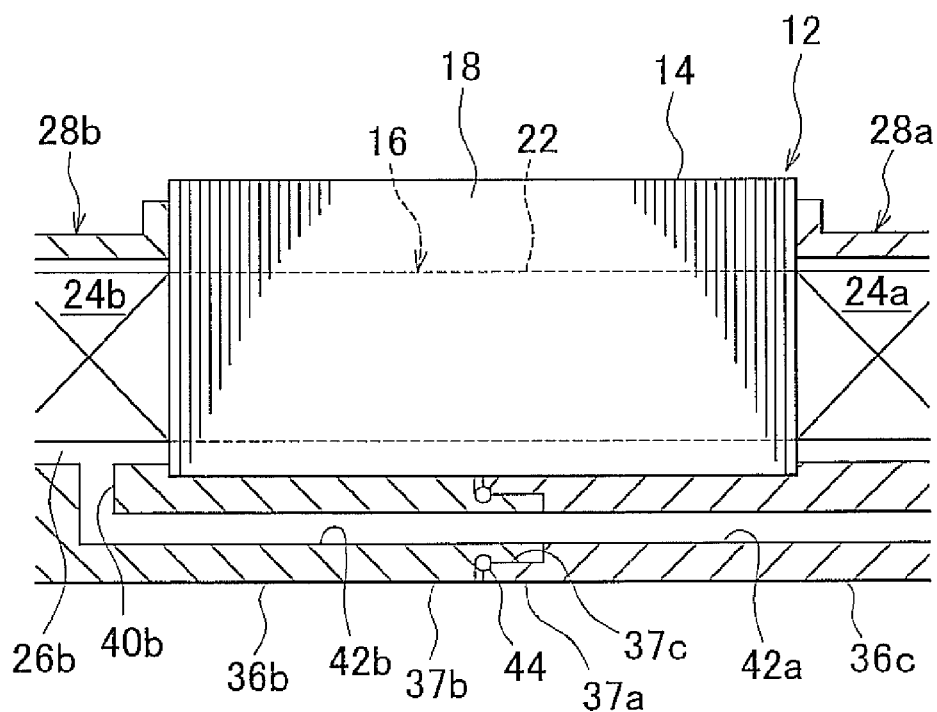
FIG. 17 is a view of another mode related to the connection of a second cooling oil supply path.
Figure 18:
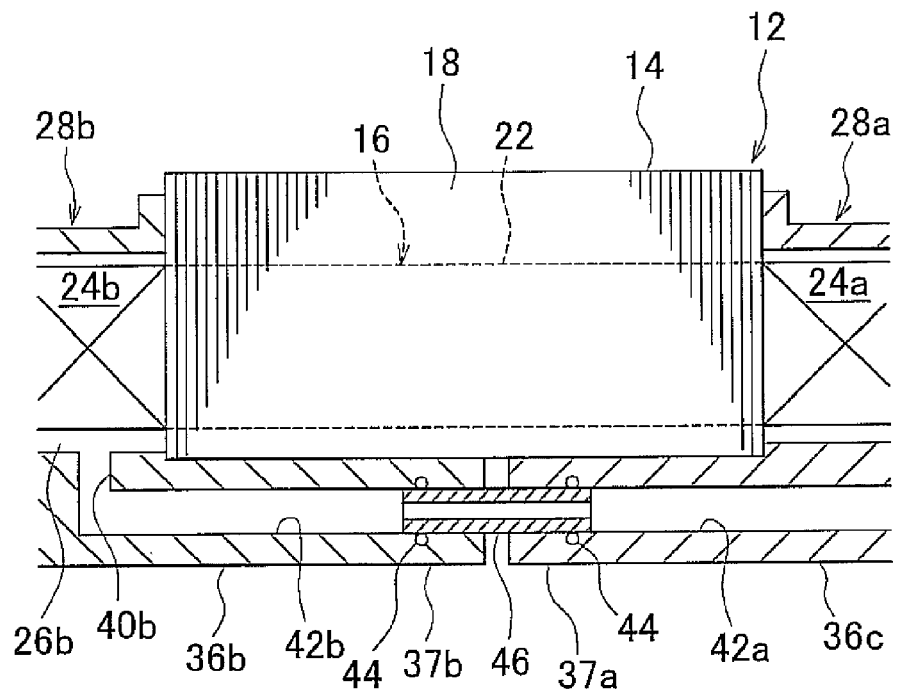
FIG. 18 is a view of yet another mode related to the connection of the second cooling oil supply path.

FIGS. 17 and 18 are views of modified examples of the connecting portion of a second lead side supply path portion 42a and a second non-lead side supply path portion 42b. In the modified example shown in FIG. 17, the end portion 37b of the non-lead side supply path forming portion 36b of the non-lead side cover member 28b is formed narrow, while a recessed portion 37c is formed inside the end portion 37a of the lead side supply path forming portion 36c of the lead side cover member 28a. This recessed portion 37c is formed having an axial length and an inside diameter that enables the narrow end portion 37b of the non-lead side supply path forming portion 36b to engage with it by press-fitting. The engagably connected connecting portion is then sealed by an appropriate seal member 44 such as an O-ring, for example. Engagably connecting the second lead side supply path portion 42a and the second non-lead side supply path portion 42b together by press-fitting and then sealing the connecting portion with a seal member in this way makes it possible to more reliably prevent cooling oil from leaking at the connecting portion.

In the modified example shown in FIG. 18, the axial length is set shorter than it is in the example shown in FIG. 14, such that there is a gap between the end portions 37a and 37b of the second supply path forming portions 36b and 36c. These supply path forming portions 36b and 36c are then connected together by a hollow connecting conduit 46 that has been press-fit at both ends into the lead side supply path portion 42a and the non-lead side supply path portion 42b. Then appropriate seals 44, such as O-rings, for example, are arranged at the outer periphery near both end portions of the connecting conduit 46 to provide a seal. Connecting the supply path forming portions 36b and 36c together with the connecting conduit 46 and providing a seal by the seal members 44 in this way makes it possible to more reliably prevent cooling oil from leaking at the connecting portion. In addition, assembly of the cooling structure 10 can be improved because any error in the circumferential positions and axial lengths of the two second supply path forming portions 36b and 36c can be absorbed by interposing the connecting conduit 46.

Figure 19:
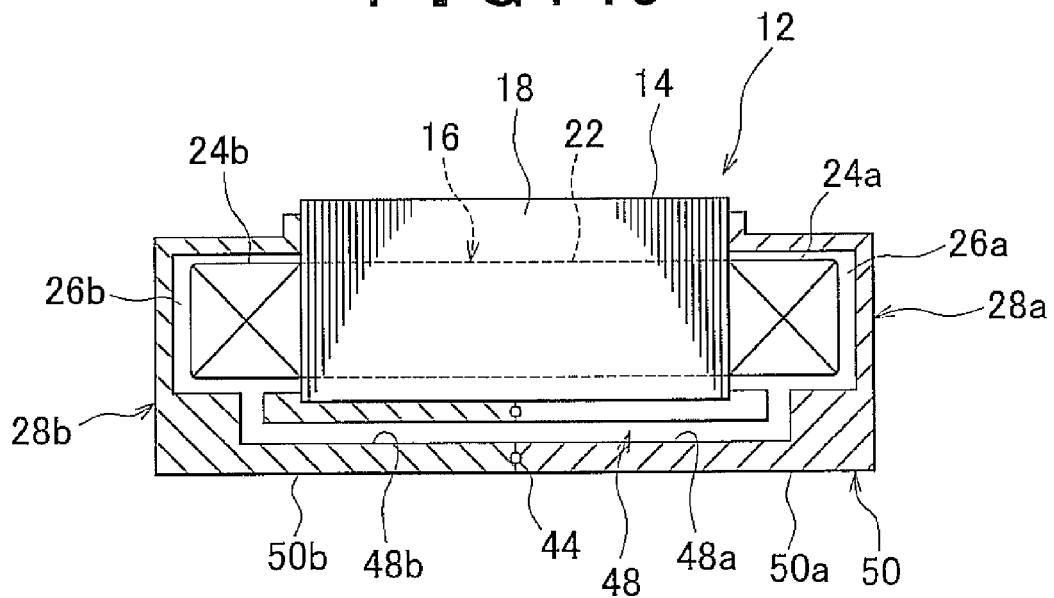
FIG. 19 is a sectional view taken along line E-E in FIG. 12.

FIG. 19 is a sectional view taken along line E-E in FIG. 12. The cooling structure 10 in this example embodiment has a communicating path 48 that communicates the first cooling oil chamber 26a formed around the lead side coil end portion 24a with the second cooling oil chamber 26b formed around the non-lead side coil end portion 24b. The communicating path 48 is formed inside a communicating path forming portion 50 that is formed bulging out radially outward and extending in the axial direction, in the outer peripheral portion of the cover members 28, as shown in FIG. 12.

In this example embodiment, regarding the cover members 28, two communicating path forming portions 50 are provided at intervals in the circumferential direction between the two supply path forming portions 36a and 36c, and a communicating path 48 is formed in each communicating path forming portion 50. Forming the communicating path 48 in this position enables the communicating path 48 to be arranged on the vertically lower side, just like the cooling oil supply path 40, when the rotary electric machine is arranged such that the center axis X lies in the horizontal direction.

The communicating path 48 is formed by a lead side communicating path portion 48a and a non-lead side communicating path portion 48b being connected together. The connection between the end portion of a lead side communicating path forming portion 50a that includes the lead side communicating path portion 48a and a non-lead side communicating path forming portion 50b that includes the non-lead side communicating path portion 48b is the same as it is with the second supply path forming portions 36b and 36c described with reference to FIGS. 14, 17, and 18, so a description thereof would be redundant and will therefore be omitted.

Communicating the first and second cooling oil chambers 26a and 26b together via the communicating path 48 in this way enables the amount and pressure of the cooling oil to be equalized between the cooling oil chambers by coolant flowing through the communicating path 48, even if the pressures and/or the amounts of cooling oil supplied to the cooling oil chambers are different. As a result, equivalent cooling performance is able to be ensured and maintained for the lead side coil end portion 24a and the non-lead side coil end portion 24b.

Also, with the cooling structure 10 according to this example embodiment, the first and second cooling oil supply ports 38a and 38b for supplying cooling oil to the first and second cooling oil chambers 26a are formed pointing in the same direction in the axial end surface of the lead side cover member 28a on one side in the axial direction. Therefore, when performing the work of assembling a motor-generator as a power supply for running that incorporates this cooling structure 10 to a transmission, the connecting work can be easily performed from one direction while checking the seal of the connecting portion, simply by ensuring work space on only one end surface side in the axial direction of the lead side cover member 28a.

The cooling structure of the rotary electric machine according to the invention is not limited to the example embodiment described above, i.e., various improvements and modifications are possible.

In the description above, the first and second cooling oil supply ports 38a and 38b are formed open in the axial end surface of the lead side cover member 28a, but the invention is not limited to this. For example, the first and second cooling oil supply ports 38a and 38b may also be formed open in an outside wall in the circumferential direction of the lead side cover member 28a. In this case, if the distance in the circumferential direction of the first and second cooling oil supply ports is not that large, they will be pointing in the same direction, so the work of connecting the cooling oil supply conduit can be performed from one direction, just as in the case described above.

Figure 20:
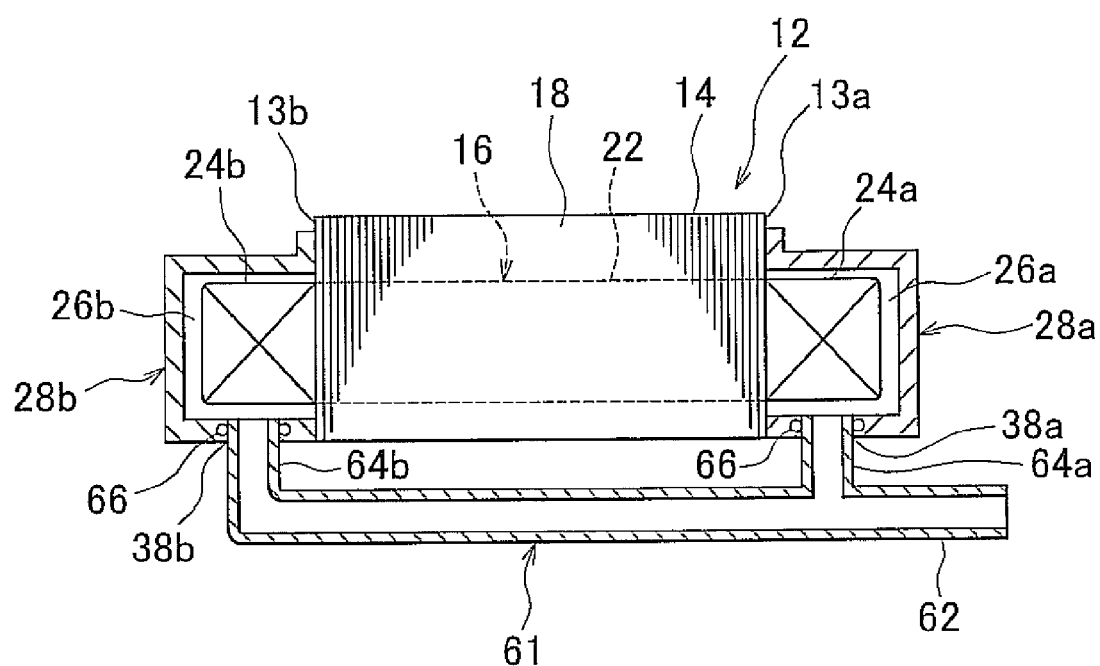
FIG. 20 is a view of a modified example in which a cooling oil supply conduit is connected to first and second cooling oil supply ports formed separately in each cover member.

Also, as shown in FIG. 20, the first cooling oil supply port 38a may be formed in the outer wall in the circumferential direction of the lead side cover member 28a, while the second cooling oil supply port 38b may be formed separately pointing in the same direction in the outer wall in the circumferential direction of the non-lead side cover member 28b. Here, the first and second cooling oil supply ports 38a and 38b may be arranged in the axial direction, or provided in positions not aligned in the axial direction. In either case, two end portions 64a and 64b of a generally F-shaped cooling oil supply conduit 61 are able to be inserted into, and thus connected to, the first and second cooling oil supply ports 38a and 38b from below the stator 12 of the rotary electric machine, so a similar operational effect as described above can be obtained.

The example embodiments described above are summarized below.

One aspect of the invention relates to a cooling structure for a rotary electric machine, that uses coolant to cool coil end portions that protrude outward, one from each end surface of a stator core in an axial direction of a stator, in a stator that includes a cylindrical stator core and a plurality of coils that are wound in a circumferential direction of the stator core. This cooling structure includes a lead side cover member that covers a lead side coil end portion to which a lead wire that supplies electricity to the coils is connected, and forms a first coolant chamber within which coolant is stored; a non-lead side cover member that covers a non-lead side coil end portion positioned opposite the lead side coil end portion in the axial direction, and forms a second coolant chamber within which coolant is stored; and a coolant supply conduit that is connected to a first coolant supply port that supplies coolant to the first coolant chamber, and a second coolant supply port that supplies coolant to the second coolant chamber. The first coolant supply port and the second coolant supply port are formed separately in the same direction in at least one of the cover members.

A lead side communicating path forming portion may be a branching conduit that discharges coolant received from a single one end portion from two other end portions, and the coolant supply conduit may be connected to the cover member by the two other end portions being press-fit into the first and second coolant supply ports from one direction.

The first and second coolant supply ports may be formed open on an end surface in the axial direction of the lead side cover member.

In order to adjust the amount of coolant supplied to each of the first and second coolant chambers, the opening diameter of the first coolant supply port and the opening diameter of the second coolant supply port may be made different, or the inside diameter of the coolant supply conduit that is connected to each of the coolant supply ports may be made different.

The path along which coolant enters the first and second coolant chambers may be formed in a general V-shape in a direction that is diagonal, not orthogonal, with respect to the outer peripheral surface of the radially outer side of the corresponding coil end portion.

Next, a third example embodiment of the invention will be described. Constituent parts of this third example embodiment that are the same as those of the first example embodiment will be denoted by the same reference characters as they are in the first example embodiment described above, and detailed descriptions of those constituent parts will be omitted.

Next, the operation of the rotary electric machine provided with the cooling structure 10 of this example embodiment will be described.

When three-phase alternating current (AC) voltage is applied to the coil 16 via the lead wires 2u, 2v, and 2w, the teeth 18 around which the coil 16 is wound become excited, such that a rotating magnetic field is created inside the stator 12. This rotating magnetic field in turn drivingly rotates the rotor inside the stator 12.

The current passing through the coil 16 generates heat in the coil 16, causing the temperature of the coil 16 to rise. If left this way, the insulating performance will decrease. More particularly, discharge tends to occur between different phase coils where the electrical potential is large at the coil end portion 24. However, in the cooling structure 10 of this example embodiment, the cooling oil chambers 26 are formed covering the entire periphery of the coil end portion 24. These cooling chambers 26 are filled with cooling oil supplied from the cooling oil supply port 38. Therefore, the coil 16 that includes the coil end portion 24 and the slot portions 22, and thus the entire stator 12, are able to be efficiently cooled by the coil end portion 24 contacting the cooling oil on the entire surface of the inside and outside surfaces in the radial direction and the end surfaces in the axial direction. Thus, with the rotary electric machine provided with the cooling structure 10 of this example embodiment, the insulating performance of the coil 16 is able to be maintained or improved. As a result, the rotary electric machine is able to be made smaller by increasing the current density of the current that flows through the coil 16, and cost is able to be reduced by eliminating the insulating paper that had been sandwiched between different phase coils at the coil end portions.

The cooling oil that has risen in temperature as a result of cooling the coil end portions 24 is discharged outside from the lead opening 29, for example, and passed through an oil cooler or the like where it releases heat such that its temperature lowers. Then the cooling oil is circulated by an oil pump to the cooling oil supply port 38.

Also, with the cooling structure 10 of this example embodiment, the cooling oil supply port 38 for supplying cooling oil to the first and second cooling oil chambers 26a and 26b via the first and second cooling oil supply paths 40a and 40b is formed only in the lead side cover member 28a on one side in the axial direction. Therefore, the work of connecting the coolant supply conduit in a fluid-tight manner to the cooling oil supply port 38 of the rotary electric machine that includes this cooling structure 10 can be performed from one side in the axial direction, which improves both assemblability of the rotary electric machine and mountability when mounting this kind of rotary electric machine to a vehicle.

The cooling structure of the rotary electric machine according to the invention is not limited to the example embodiment described above, i.e., various improvements and modifications are possible.

For example, with the cooling structure 10 described above, the cooling oil supply port for supplying cooling oil to the first and second cooling oil chambers 26a and 26b is provided in the lead side cover member 28a itself, but the invention is not limited to this. That is, a cooling oil supply port that is separate from the cover member may be provided on the same side as the lead side cover member, and this cooling oil supply port may be pipe-connected with the first and second cooling oil supply paths.

Also, in the description above, the cooling oil supply port is formed in the lead side cover member 28a, but conversely, a cooling oil supply port may also be formed in only the non-lead side cover member 28b.

Furthermore, in the description above, the first and second cooling oil supply paths 40a and 40b are communicated with one cooling oil supply port 38, but the invention is not limited to this. That is, one of two cooling oil supply ports 38 may be connected to the first cooling oil chamber 26a via the first cooling oil supply path 40a, as shown in FIG. 10, or the other cooling oil supply port 38 may be connected to the second cooling oil chamber 26b via the second cooling oil supply path 40b, as shown in FIG. 11.

This example embodiment is summarized below.

One aspect of the invention relates to a cooling structure for a rotary electric machine, that uses coolant to cool coil end portions that protrude outward, one from each end surface of a stator core in an axial direction of a stator, in a stator that includes a cylindrical stator core and a plurality of coils that are wound in a circumferential direction of the stator core. This cooling structure includes a lead side cover member that covers a lead side coil end portion to which a lead wire that supplies electricity to the coils is connected, and forms a first coolant chamber within which coolant is stored, and has a first coolant supply path that is communicated with the first coolant chamber; and a non-lead side cover member that covers a non-lead side coil end portion positioned opposite the lead side coil end portion in the axial direction, and forms a second coolant chamber within which coolant is stored, and has a second coolant supply path that is communicated with the second coolant chamber. A coolant supply port that supplies coolant into the first coolant chamber via the first coolant supply path and into the second coolant chamber via the second coolant supply path is formed on a side of one of the lead side cover member and the non-lead side cover member.

The coolant supply port may be formed in the lead side cover member, and the second coolant supply path may include a non-lead side supply path portion formed in the non-lead side cover member, and a lead side supply path portion formed in the lead side cover member. The non-lead side supply path portion and the lead side supply path portion may be connected together in a fluid-tight manner at an outer side of an outer peripheral surface of the stator core, and the lead side supply path portion may be communicated with the coolant supply port and the first coolant supply path.

An end surface in the axial direction of a non-lead side supply path forming portion that includes the non-lead side supply path portion may be connected in a fluid-tight manner via a seal member to an end surface in the axial direction of a lead side supply path forming portion that includes the lead side supply path portion.

A non-lead side supply path forming portion that includes the non-lead side supply path portion may be connected to a lead side supply path forming portion that includes the lead side supply path portion, by an end portion in the axial direction of the non-lead side supply path forming portion being fit together with an end portion in the axial direction of the lead side supply path forming portion.

A non-lead side supply path forming portion that includes the non-lead side supply path portion may be connected to a lead side supply path forming portion that includes the lead side supply path portion, via a connecting conduit of which one end portion is inserted into the non-lead side supply path portion and the other end portion is inserted into the lead side supply path portion.

A portion near the coolant chamber of the first coolant supply path and a portion near the coolant chamber of the second coolant supply path may each be formed in a direction that is diagonal, not orthogonal, with respect to an outer peripheral surface of a radially outer side of the corresponding coil end portion.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A cooling structure for a rotary electric machine having a stator that includes a cylindrical stator core and a plurality of coils that are wound in a circumferential direction of the stator core, the cooling structure using coolant to cool coil end portions that protrude outward, one from each end surface of the stator core in an axial direction of the stator, the cooling structure comprising:

a lead side cover member that covers a lead side coil end portion to which a lead wire that supplies electricity to the coils is connected, the lead side cover member forming a first coolant chamber within which coolant is stored;

a non-lead side cover member that covers a non-lead side coil end portion positioned opposite the lead side coil end portion in the axial direction, the non-lead side cover member forming a second coolant chamber within which coolant is stored;

a coolant communicating path;

a first coolant supply path that supplies coolant from the coolant communicating path to the first coolant chamber; and a second coolant supply path that supplies coolant from the coolant communicating path to the second coolant chamber, wherein the coolant communicating path is provided to communicate the first coolant chamber and the first coolant supply path with the second coolant chamber and the second coolant supply path in a manner that enables coolant to flow therebetween, and wherein a supply path inside diameter of the first coolant supply path is made different than a supply path inside diameter of the second coolant supply path.

2. The cooling structure of a rotary electric machine according to claim 1, wherein a portion near the first coolant chamber of the first coolant supply path and a portion near the second coolant chamber of the second coolant supply path are each formed in a direction that is diagonal, not orthogonal, with respect to an outer peripheral surface of a radially outer side of the corresponding coil end portion.

3. A cooling structure for a rotary electric machine having a stator that includes a cylindrical stator core and a plurality of coils that are wound in a circumferential direction of the stator core, the cooling structure using coolant to cool coil end portions that protrude outward, one from each end surface of the stator core in an axial direction of the stator, the cooling structure comprising:

a lead side cover member that covers a lead side coil end portion to which a lead wire that supplies electricity to the coils is connected, the lead side cover member forming a first coolant chamber within which coolant is stored;

a non-lead side cover member that covers a non-lead side coil end portion positioned opposite the lead side coil end portion in the axial direction of the stator, the non-lead side cover member forming a second coolant chamber within which coolant is stored; and a coolant supply pipe that is connected to a first coolant supply port that supplies coolant to the first coolant chamber, and a second coolant supply port that supplies coolant to the second coolant chamber, wherein the first coolant supply port and the second coolant supply port are formed separately so as to be opened in the same direction in one of the lead side cover member and the non-lead side cover member, and wherein the first coolant supply port and the second coolant supply port are formed on an outer end portion of one of the lead side cover member and the non-lead side cover member.

4. The cooling structure for a rotary electric machine according to claim 3, wherein the coolant supply pipe is external to the lead side cover and the non-lead side cover.

5. The cooling structure for a rotary electric machine according to claim 4, wherein the coolant supply pipe includes a first outlet, a second outlet, and a single inlet, the first outlet engages with the first coolant supply port and the second outlet engages with the second coolant supply port.

* * * * *